US008391418B2

(12) United States Patent
Kodama et al.

(10) Patent No.: US 8,391,418 B2
(45) Date of Patent: Mar. 5, 2013

(54) OFDM SYMBOL DETECTING METHOD, COMMUNICATION APPARATUS, INTEGRATED CIRCUIT, AND CIRCUIT MODULE

(75) Inventors: Nobutaka Kodama, Fukuoka (JP); Hisao Koga, Fukuoka (JP)

(73) Assignee: Panasonic Corporation, Osaka (JP)

( * ) Notice: Subject to any disclaimer, the term of this patent is extended or adjusted under 35 U.S.C. 154(b) by 745 days.

(21) Appl. No.: 12/533,768

(22) Filed: Jul. 31, 2009

(65) Prior Publication Data
US 2010/0195772 A1 Aug. 5, 2010

(30) Foreign Application Priority Data
Jul. 31, 2008 (JP) ................. P2008-198213

(51) Int. Cl.
*H04L 27/00* (2006.01)
(52) U.S. Cl. ........................... 375/324; 375/340
(58) Field of Classification Search ................. 375/260, 375/324, 326, 340; 455/59, 67.11, 205, 295
See application file for complete search history.

(56) References Cited

U.S. PATENT DOCUMENTS

| 7,792,199 | B2 | 9/2010 | Kodama | |
|---|---|---|---|---|
| 7,978,772 | B2 | 7/2011 | Koga | |
| 2003/0236071 | A1* | 12/2003 | Ito | ................ 455/59 |
| 2004/0218695 | A1 | 11/2004 | Koga | |
| 2005/0037722 | A1 | 2/2005 | Koga | |
| 2006/0013338 | A1* | 1/2006 | Gore et al. | ............ 375/324 |
| 2007/0009055 | A1 | 1/2007 | Koga | |
| 2007/0071124 | A1 | 3/2007 | Kodama | |
| 2008/0013637 | A1 | 1/2008 | Kodama | |
| 2010/0002783 | A1* | 1/2010 | Qi et al. | ............... 375/260 |

FOREIGN PATENT DOCUMENTS

| JP | 2005-57644 | 3/2005 |
|---|---|---|
| JP | 2007-19597 | 1/2007 |
| JP | 2007-96469 | 4/2007 |
| JP | 2007-281577 | 10/2007 |

OTHER PUBLICATIONS

International Search Report dated Nov. 24, 2009.
H. Tang, "Some Physical Layer Issues of Wide-Band Cognitive Radio Systems," 2005 $1^{st}$ IEEE International Symposium on New Frontiers in Dynamic Spectrum Access Networks, XP00255250, Nov. 2005, pp. 151-159.

* cited by examiner

*Primary Examiner* — Leon-Viet Nguyen
(74) *Attorney, Agent, or Firm* — Dickinson Wright PLLC

(57) ABSTRACT

A method of detecting symbols of an OFDM signal constituted by a plurality of carriers transmitted from another communication apparatus, includes selecting first carriers, where a phase difference between the symbols adjacent on a time domain is smaller than a predetermined value, from a plurality of carriers of a received signal, selecting second carriers, each of which has a phase of a predetermined relation of the OFDM signal with respect to another carrier, from the selected first carriers, and determining whether the received signal has the symbols of the OFDM signal transmitted from the another communication apparatus on the basis of the selection results of the first and second carriers.

9 Claims, 15 Drawing Sheets

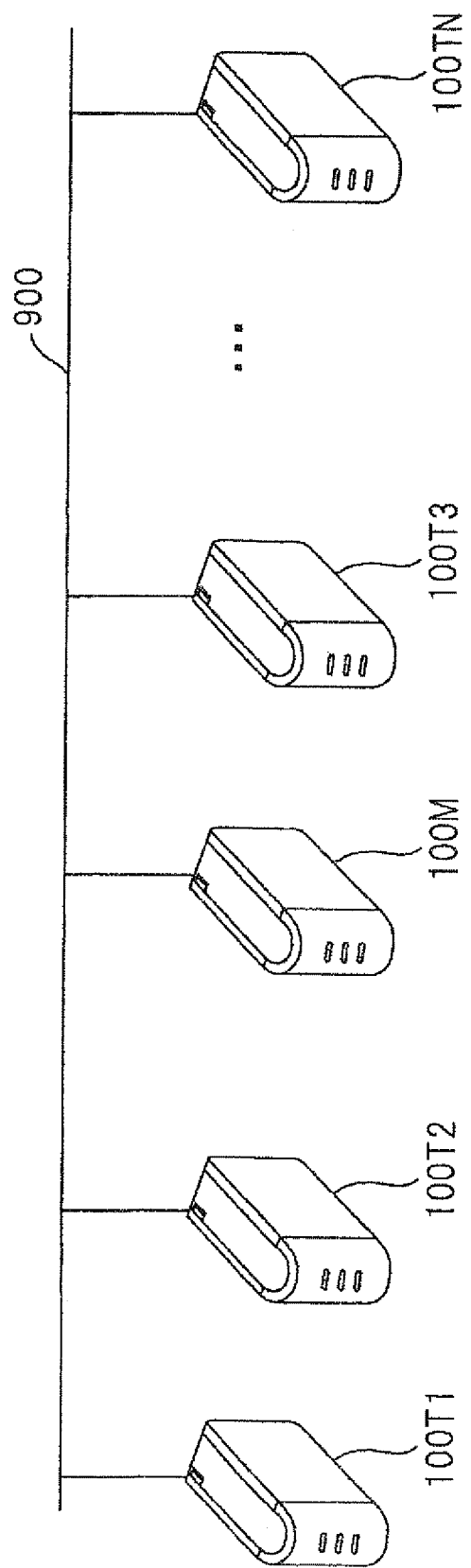

OFDM SYMBOL DETECTING METHOD, COMMUNICATION APPARATUS, INTEGRATED CIRCUIT, AND CIRCUIT MODULE

BACKGROUND

The present invention relates to a method of detecting symbols of an OFDM (Orthogonal Frequency Division Multiplexing) signal transmitted from another communication apparatus, a communication apparatus including an OFDM symbol detecting unit in a power line communication, etc.

A transmission method of using a plurality of sub-carriers, such as an OFDM method, has a big advantage in realizing high quality communication even though a transmission channel is in a severe environment. Therefore, this transmission method is also used for wired communication such as power line communication as well as wireless communication.

In a multi-carrier communication apparatus for carrying out communication using a plurality of sub-carriers, a transmitting side converts bit data to be transmitted into symbol data, executes symbol mapping on the symbol data, converts the symbol data into data on a time domain by executing an inverse FFT conversion or a inverse wavelet conversion, executes a parallel-serial conversion, converts the data into baseband analog signals by executing a DA conversion, and transmits the converted baseband analog signals. In addition, a receiving side converts the received signals into digital signal by executing an AD conversion, executes a serial-parallel conversion, converts the data into data on a frequency domain by executing an FFT conversion or a wavelet conversion, and executes demapping so as to obtain reception bit data.

The multi-carrier communication apparatus has a carrier detecting function of determining whether another communication apparatus transmits signals to a transmission line. When another communication apparatus does not use the transmission line, the multi-carrier communication apparatus executes a transmission process in response to a transmission request.

As a carrier detecting method in the multi-carrier communication apparatus, there is known a method of detecting whether a multi-carrier signal exists by calculating an average value of all sub-carriers on the basis of signals obtained by converting digital waveform data on the time-domain into data on the frequency-domain, for example (see patent literature 1). In the carrier detection, a high detection accuracy can be obtained by using a correlation between adjacent sub-carriers in a frequency domain on the basis of an OFDM property that the plurality of sub-carriers is arranged at the same interval.

As another example of the carrier detecting method, there is known a method of detecting whether a multi-carrier signal exists by determining the correlation on the basis of a distribution of constellation points on the complex coordinates or by calculating the correlation between the alternately adjacent sub-carriers when calculating the correlation between the adjacent sub-carriers (see patent literature 2). In the OFDM, phase differences between all the adjacent sub-carriers are the same in a preamble of a frame header. Therefore, by evaluating the distribution of the constellation points on the complex coordinates, it can be determined whether the multi-carrier signal exists with high accuracy.

[Patent literature 1] JP-A-2005-57644
[Patent literature 2] JP-A-2007-281577

In the method of executing the carrier detection using the average value of all the sub-carriers, as in patent literature 1, a problem arises in that the carrier detection is possible in a state where a narrowband noise occurs in a part of frequency used in communication but the carrier detection cannot be executed since it is difficult to deal with a state where large level noises overlap with each other across a broadband spectrum.

Also, in the method of executing the carrier detection by calculating the inter-carrier correlation by the use of the distribution of the constellation points on the complex coordinates, as in patent literature 2, the carrier detection can be executed with high accuracy by the use of the inter-carrier correlation. However, the signal cannot be received since the half or more of the sub-carriers are submerged in noise, for example. Therefore, a problem arises in that the carrier detection cannot be normally executed in many cases since there is a low probability that the phase difference between the adjacent sub-carriers falls within a predetermined range in a state where only a few of the sub-carriers are received, for example.

In the known carrier detecting methods, the carrier detection cannot be normally executed even with the existence of the signals in some cases, when the large level noises occur across in the broadband spectrum. In particular, under an environment where transmission feature vary due to the connection of another communication apparatus to the power line serving as a transmission line or a noise occurs due to another communication apparatus, as in the power line communication, it cannot be normally determined whether a reception target signal exists or it takes significant time to determine whether the received signal is a reception target signal.

SUMMARY

The invention is devised in view of the above-mentioned circumstance and an object of the invention is to provide an OFDM symbol detecting method and a communication apparatus capable of determining whether a multi-carrier signal exists with high accuracy in a short period of time.

According to an aspect of the invention, there is a provided a method of detecting symbols of an OFDM signal constituted by a plurality of carriers transmitted from another communication apparatus. The method includes: selecting first carriers, where a phase difference between the symbols adjacent on a time domain is smaller than a predetermined value, from a plurality of carriers of a received signal; selecting second carriers, each of which has a phase of a predetermined relation of the OFDM signal with respect to another carrier, from the selected first carriers; and determining whether the received signal has the symbols of the OFDM signal transmitted from the another communication apparatus on the basis of the selection results of the first and second carriers.

With such a configuration, it is determined whether the plurality of carriers has the symbols of the OFDM signal by using the property of the phase of the carrier of another frequency in the OFDM signal. Therefore, it is possible to determine whether the OFDM signal has the symbols with high accuracy.

Preferably, in the process of selecting second carriers, a carrier having a phase being "a phase of a basic carrier×N", where an order of the carrier is N, as the phase of the predetermined relation is selected as the second carrier on the basis of the phase of the basic carrier and the order of the carrier.

With such a configuration, the second carriers can be selected using the phases of two carriers to all arbitrary number of carriers among the plurality of carriers. Therefore, the condition of selecting the second carriers can become numerous. Moreover, it is possible to effectively use the signals.

Preferably, in the process of selecting second carriers, a carrier having a phase, where a phase difference between the adjacent carriers is constant, as the phase of the predetermined relation is selected as the second carrier.

With such a configuration, the determination is executed using the adjacent carriers among the plurality of carriers. Therefore, by just determining the phase differences between the adjacent carriers in order from a low frequency to a high frequency or in order from a high frequency to a low frequency, all the carriers can be determined. As a consequence, the process of determining the carriers can be executed at a high speed.

Preferably, in the process of selecting second carriers, carriers where complex coordinates representing the phase difference between the adjacent carriers exist on the same quadrant are selected as the second carrier.

With such a configuration, since the phase difference between the plurality of carriers can be determined by the signs of a real part and an imaginary part on the complex coordinates, the process of determining the carriers can be simplified. Accordingly, the process may be executed at a higher speed.

Preferably, in the carrier determination process, it is determined that the received signal has the symbols of the OFDM signal, when a ratio of the number of second carriers to the number of first carriers is equal to or larger than a predetermined ratio.

With such a configuration, the carrier detection can be executed with high accuracy by using both the selection result of the first carriers and the selection result of the second carriers.

Preferably, in the process of selecting first carriers, the number of carriers where the phase differences between the symbols adjacent on the time domain in the carrier and a carrier adjacent to the carrier are smaller than a predetermined value is detected as a total number of carriers. In the carrier determination process, it is determined that the received signal has the symbol of the OFDM signal, when a ratio of the number of second carriers to the total number of carriers is equal to or larger than a predetermined threshold value.

With such a configuration, when the ratio of the number of second carriers to the total number of carriers calculated in the selection of the first carriers is equal to or larger than the predetermined threshold value, it is determined whether the signal has the symbols of the OFDM signal. Accordingly, the carrier detection can be executed with high accuracy.

Preferably, in the process of selecting first carriers, the number of individual carriers where the phase difference between the symbols adjacent on the time domain is smaller than a predetermined value is detected as a total number of received carriers, and the number of carriers where the phase differences between the symbols adjacent on the time domain in the carrier and a carrier adjacent to the carrier are smaller than a predetermined value is detected as a total number of carriers. In the carrier determination process, it is determined that the received signal has the symbols of the OFDM signal, when a ratio of the number of second carriers to the total number of carriers is equal to or larger than a first threshold value, and a ratio of the number of second carriers to the total number of received carriers is equal to or larger than a second threshold value.

With such a configuration, when the ratio of the number of second carriers to the total number of carriers calculated in the selection of the first carriers is equal to or larger than the first threshold value and the ratio of the number of second carriers to the total number of received carriers in the selection of the first carriers is equal to or larger than the second threshold value, it is determined whether the signal has the symbols of the OFDM signal. Accordingly, it is possible to reduce the erroneous detection and execute the carrier detection with higher accuracy.

Preferably, the received signal is a preamble of a packet.

With such a configuration, since the header of the packet can be detected with high accuracy, it is possible to reduce a reception error of the packet and improve a reception performance.

Preferably, the received signal is a postamble of a packet.

With such a configuration, it is possible to detect the end portion of the packet with high accuracy. Therefore, even when a noise overlaps in the packet, a state can be switched from the data reception to standby of a subsequent packet. Accordingly, the reception performance is improved.

Preferably, the received signal is a coexistence signal transmitted from another communication apparatus.

With such a configuration, since it is possible to receive the coexistence signal of another communication apparatus with high accuracy, the data transmission of another communication apparatus is not interrupted.

According to the present invention, there is also provided a communication apparatus, that which includes: a receiver which receives a signal transmitted from another communication apparatus, and a carrier detector which executes a carrier detection by detecting symbols of an OFDM signal in the signal received by the receiver. The carrier detector includes a first selecting unit which selects first carriers, where a phase difference between the symbols adjacent on a time domain is smaller than a predetermined value, from the carriers of the received signal, a second selecting unit which selects second carriers, each of which has a phase of a predetermined relation of the OFDM signal with respect to another carrier, from the selected first carriers, and a carrier determining unit which determines whether the received signal has the symbols of the OFDM signal transmitted from the another communication apparatus on the basis of the selection results of the first and second carriers.

With such a configuration, it is determined whether the frequencies of the received signal corresponding to the plurality of carriers have the symbols of the OFDM signal by using the property of the phase of the carrier of another frequency in the OFDM signal. Therefore, the carrier detection can be executed with high accuracy.

According to the present invention, there is also provided an integrated circuit, that includes a receiver which receives a signal transmitted from another communication apparatus through a coupler interfacing a communication medium, and a carrier detector which executes a carrier detection by detecting symbols of an OFDM signal in the signal received by the receiver. The carrier detector includes a first selecting unit which selects first carriers, where a phase difference between the symbols adjacent on a time domain is smaller than a predetermined value, from the carriers of the received signal, a second selecting unit which selects second carriers, each of which has a phase of a predetermined relation of the OFDM signal with respect to another carrier, from the selected first carriers, and a carrier determining unit which determines whether the received signal has the symbols of the OFDM signal transmitted from the another communication apparatus on the basis of the selection results of the first and second carriers.

According to the present invention, there is also provided a circuit module, that includes a coupler which interfaces a communication medium, a receiver which receives a signal transmitted from another communication apparatus through the coupler, and a carrier detector which executes a carrier detection by detecting symbols of an OFDM signal in the signal received by the receiving unit. The carrier detector includes a first selecting unit which selects first carriers, where a phase difference between the symbols adjacent on a time domain is smaller than a predetermined value, from the carriers of the received signal, a second selecting unit which selects second carriers, each of which has a phase of a predetermined relation of the OFDM signal with respect to another carrier, from the selected first carriers, and a carrier determining unit which determines whether the received signal has the symbols of the OFDM signal transmitted from the another communication apparatus on the basis of the selection results of the first and second carriers.

According to the invention, it is possible to provide an OFDM symbol detecting method and a communication apparatus capable of determining whether multi-carrier signals exist with high accuracy in a short period of time.

BRIEF DESCRIPTION OF THE DRAWINGS

FIG. 1 is a diagram illustrating the configuration of a power line communication system according to an embodiment of the invention;

DETAILED DESCRIPTION OF EXEMPLARY EMBODIMENTS

Hereinafter, a case where an OFDM symbol detecting method of a communication apparatus is applied to a power line communication apparatus capable of carrying out communication over a power line as a transmission line will be described according to an embodiment of the invention.

FIG. 1 is a diagram illustrating the configuration of a power line communication system according to the embodiment of the invention. In FIG. 1, the power line communication system includes PLC (Power Line Communication) modems 100M, 100T1, 100T2, 100T3, . . . , 100TN as a plurality of communication apparatuses connected to a power line 900. In FIG. 1, five PLC modems are illustrated, but the number of modes is arbitrary (not limited). The PLC modem 100M serves as a master device and manages the connection status (link status) of the other PLC modems 100T1, . . . , and 100TN which serve as slave devices. However, the PLC modem serving as the master device is not an essential device.

In the following description, when the master device and certain slave devices are mentioned, the term of PLC modem 100M, 100T1, 100T2, 100T3, . . . , and 100TN is used. When the slave device is mentioned, the term of a PLC modem 100T is used. When PLC modems regardless of the master device and the slave device are mentioned, the term of a PLC modem 100 is used.

Just one power line 900 is illustrated in FIG. 1, but there are in fact two or more lines. The PLC modems 100 are connected to two of the power lines.

Figure 2A:
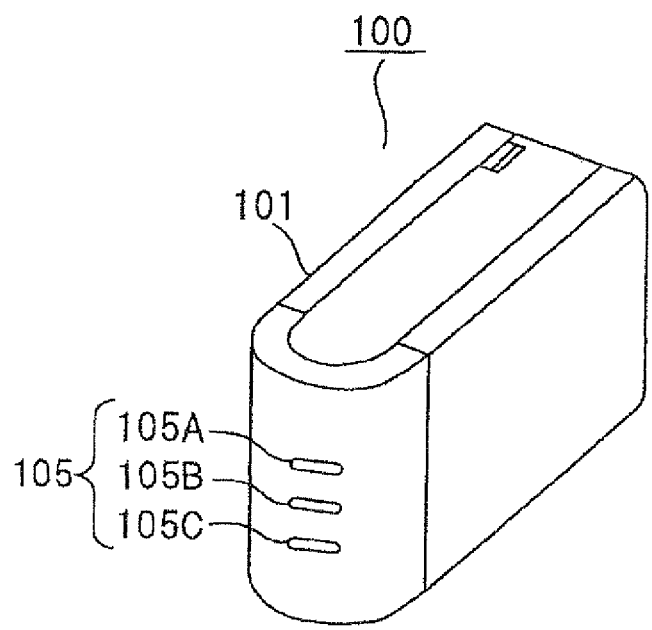
FIG. 2A is an outer appearance perspective view for representing a front plane of a PLC modem.
Figure 2B:
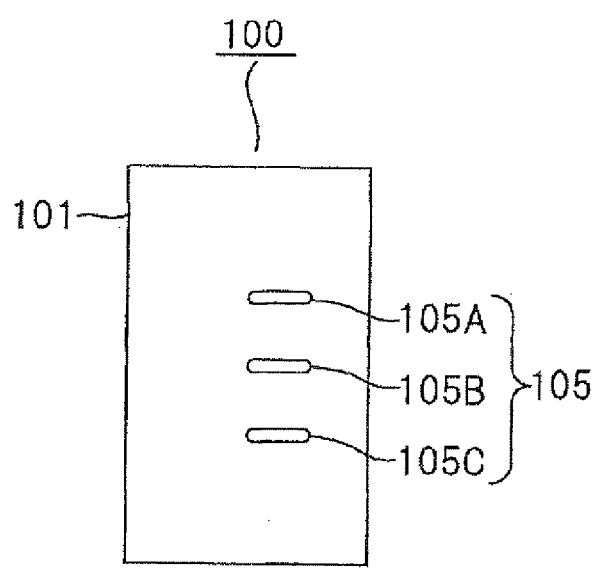
FIG. 2B is a front view of the PLC modem.
Figure 2C:
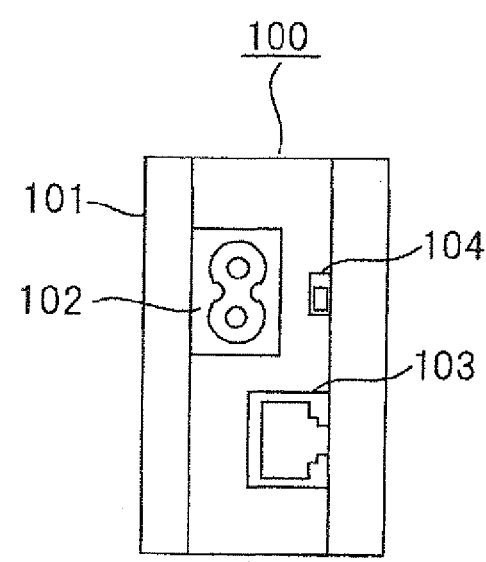
FIG. 2C is a rear view of the PLC modem.

FIGS. 2A to 2C are diagrams illustrating the overviews of the PLC modem 100. FIG. 2A is an external perspective view illustrating the front surface thereof, FIG. 2B is a front view illustrating the PLC modem, and FIG. 2C is a rear view illustrating the PLC modem. The PLC modem 100 shown in FIGS. 2A t 2C has a casing 101. As shown in FIGS. 2A and 2B, an indicator 105 constituted by LEDs (light Emitting Diodes) 105A, 105B, and 105C is provided on the front surface of the casing 101. As shown in FIG. 2C, a power supply connector 102, a modular jack 103 for the LAN (Local Area Network) such as the RJ 45, and a switch 104 for switching operation modes are provide on the rear surface of the casing 101. A power cable (not shown in FIGS. 2A to 2C) is connected to the power supply connector 102. A LAN cable (not shown in FIGS. 2A to 2C) is connected to the modular jack 103. The PLC modem 100 may be further provided with a Dsub (D-subminiature) connector to connect a Dsub cable thereto.

Figure 3:
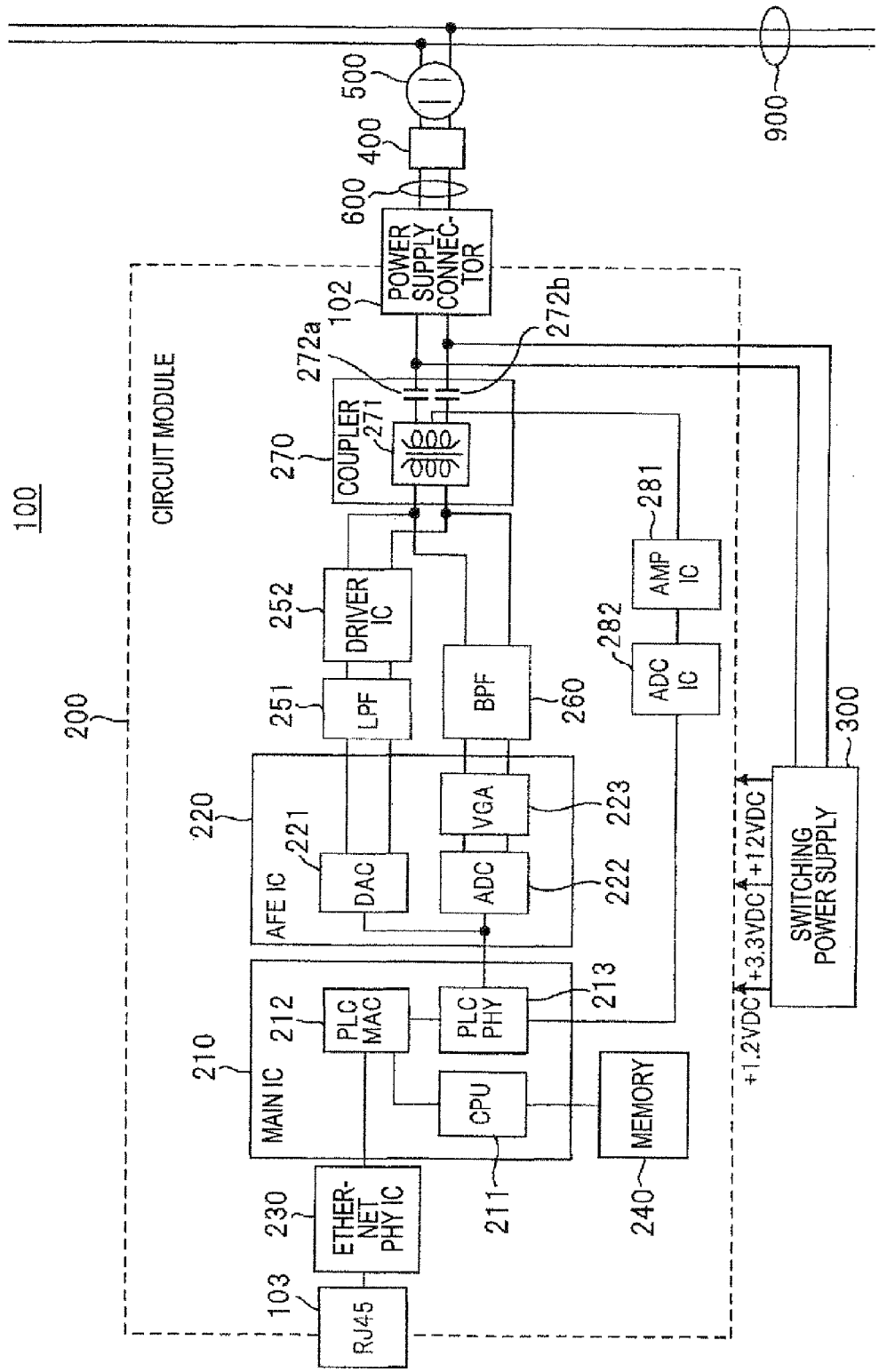
FIG. 3 is a block diagram illustrating an example of the hardware configuration of the PLC modem according to the embodiment.

FIG. 3 is a block diagram illustrating an example of the hardware configuration of the PLC modem 100. As shown in FIG. 3, the PLC modern 100 includes a circuit module 200 and a switching power source 300. The switching power source 300 supplies various types (for example, +1.2 V, +3.3 V, and +12V) of voltage to the circuit module 200 and includes a switching transformer and a DC-DC converter (none of which is illustrated), for example.

The circuit module 200 includes a main IC (Integrated Circuit) 210, an AFE IC (Analog Front END Integrated Circuit) 220, an Ethernet PHY IC (Physic layer Integrated Circuit) 230, a memory 240, a lowpass filter (LPF) 251, a driver IC 252, a bandpass filter (BPF) 260, and a coupler 270. The switching power source 300 and the coupler 270 are connected to the power supply connector 102 and also connected to the power line 900 through a power supply cable 600, a power supply plug 400, and an outlet 500. The main IC 210 functions as a control circuit for carrying out power line communication.

The main IC 210 includes a CPU (Central Processing Unit) 211, a PLC MAC (Power Line Communication Media Access Control layer) block 212, and a PLC PHY (Power Line Communication Physical layer) block 213. A 32-bit RISC (Reduced Instruction Set Computer) processor is mounted in the CPU 211. The PLC MAC block 212 manages a MAC layer (Media Access Control layer) of transmitted and received signals and the PLC PHY block 213 manages a PHY layer (Physical Layer) of the transmitted and received signals. The AFE IC 220 includes a DA converter (DAC: D/A converter) 221, an AD converter (ADC: A/D converter) 222, and a variable gain amplifier (VGA: Variable Gain Amplifier) 223. The coupler 270 includes a coil transformer 271 and coupling capacitors 272a and 272b. The CPU 211 controls operations of the PLC MAC block 212 and the PLC PHY block 213 using data stored in the memory 240 and also controls the PLC modem 100 as a whole.

A communication is carried out by the PLC modems 100 generally as follows. That is, data input from the modular jack 103 is transmitted to the main IC 210 via the Ethernet PHY IC 230, and a digital transmission signal is generated by executing a digital signal process to the transmitted data. The generated digital transmission signal is converted into an analog signal by the DA converter (DAC) 221 of the AFE IC 220 and output to the power line 900 via the lowpass filter 251, the driver IC 252, the coupler 270, the power supply connector 102, the power supply cable 600, the power supply plug 400, and the outlet 500.

The signal received from the power line 900 is transmitted to the bandpass filter 260 via the coupler 270, the gain thereof is adjusted by the variable gain amplifier (VGA) 223 of the AFE IC 220, and the signal is converted into a digital signal by the AD converter (ADC) 222. The converted digital signal is transmitted to the main IC 210 and converted into digital data by executing a digital signal process to the transmitted signal. The converted digital data is output from the modular jack 103 via the Ethernet PHY IC 230.

The PLC modem 100 carries out multi-carrier communication by using a plurality of sub-carriers by an OFDM method. The digital signal processing on a communication signal is realized by the main IC 210. Here, the digital signal processing such as a process of converting transmission data into an OFDM transmission signal, as a process of converting received OFDM signal into the reception data, and a carrier detecting process of detecting whether a transmitted OFDM signal exists are mainly executed by the PLC PHY block 213.

Figure 4:
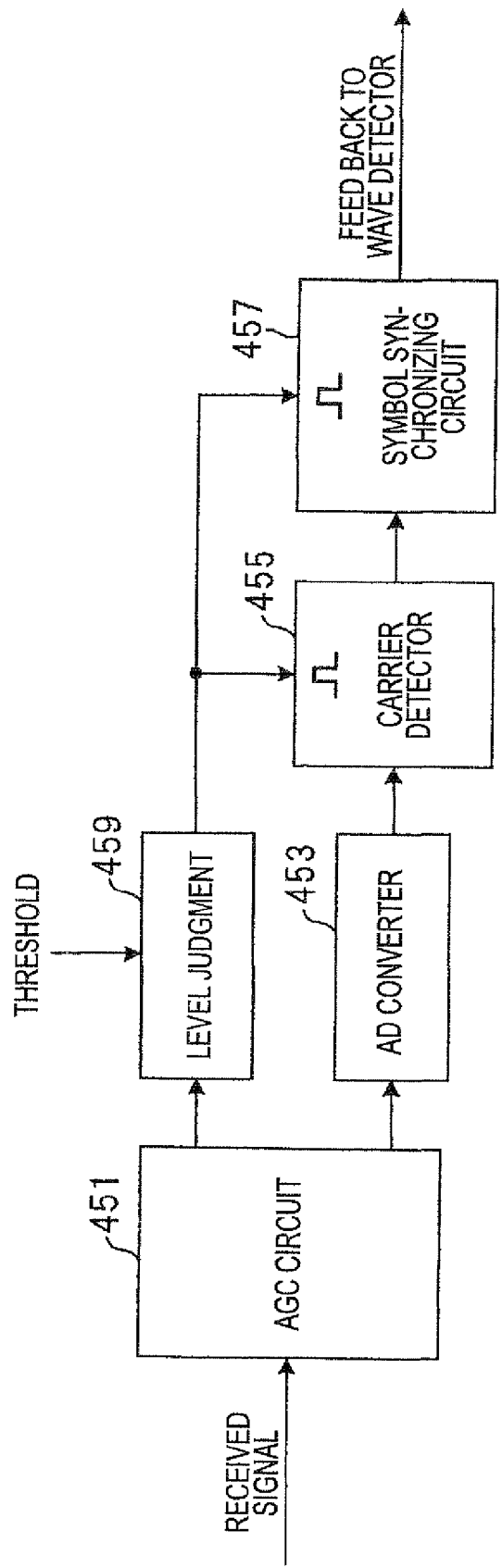
FIG. 4 is a block diagram illustrating the configuration of an input unit of a receiver of the communication apparatus according to the embodiment.

FIG. 4 is a block diagram illustrating the configuration of an input unit of a receiver of the communication apparatus according to the embodiment. The receiver includes an auto gain control circuit (hereinafter, referred to as AGC) 451, an analog-digital converter (hereinafter, referred to as an AD converter) 453, a carrier detector 455, a symbol synchronizing circuit 457, and a level judgment circuit 459. When the configuration of FIG. 4 is applied to the PLC modem 100 shown in FIG. 3, the AGC circuit 451 corresponds to the VGA 223 of the AFE IC 220, and the AD converter 453 corresponds to the ADC 222. The carrier detector 455, the symbol synchronizing circuit 457, and the level judgment circuit 459 are configured by the PLC PHY block 213 and the CPU 211 of the main IC 210 so as to realize the functions of the units.

The received signal is level-adjusted to a predetermined gain by the AGC circuit 451, converted into a digital signal by the AD converter 453, and input to the carrier detector 455. The level judgment circuit 459 compares the gain level from the AGC circuit 451 to a predetermined threshold value and outputs an ON signal or an OFF signal to the carrier detector 455 and the symbol synchronizing circuit 457 in accordance with the large or small size of the gain level.

The carrier detector 455 evaluates an inter-symbol correlation of the received signal of the OFDM signals, selects sub-carriers having a high probability as carriers, evaluates an inter-carrier correlation, and determines whether the received signal is a multi-carrier signal to execute a carrier detecting process. The details of the configuration and the method of detecting the carriers are described below. On the basis of the detection result of the carrier detector 455, the symbol synchronizing circuit 457 executes a symbol synchronizing process of taking synchronization of the symbols of the received signal of which the carriers are detected. The carrier detection output and the symbol synchronization output are fed back to a wave detector which executes a process of converting data of the received signal into complex data thereof.

First, when a desired signal does not exist in the received signal, the gain of the AGC circuit 451 is set to the maximum gain. Alternatively, when the desired signal exists in the received signal, the gain of the AGC circuit 451 is adjusted and set in accordance with the level of the received signal. The gain of the AGC circuit 451 set when the desired signal exists is smaller than the maximum value. The level judgment circuit 459 executes determination by comparing the gain level of the AGC circuit 451 to a threshold value. When the gain level is larger than the threshold value, the level judgment circuit 459 outputs the OFF signal for not operating the carrier detector 455 and the symbol synchronizing circuit 457. Alternatively, when the gain level is smaller than the threshold value, the level judgment circuit 459 outputs the ON signal for operating the carrier detector 455 and the symbol synchronizing circuit 457. In this way, only when the desired signal exists in the received signal, it is possible to operate the carrier detector 455 and the symbol synchronizing circuit 457.

Figure 5:
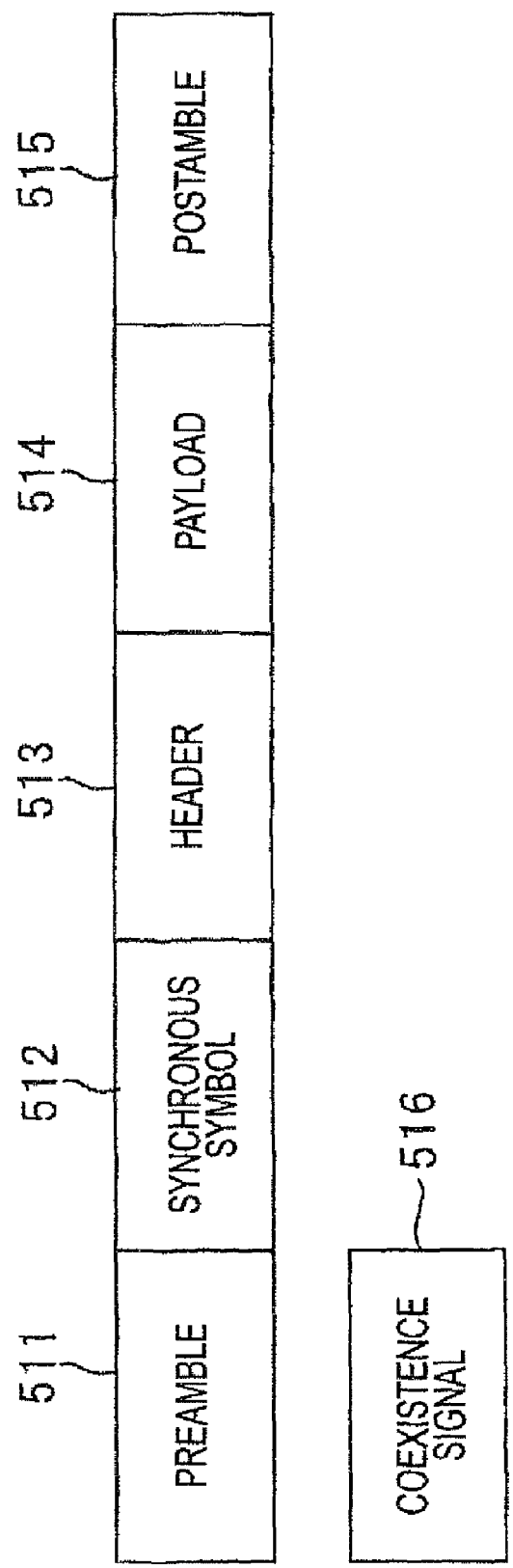
FIG. 5 is a diagram illustrating an example of the frame configuration of a communication signal handled by the communication apparatus according to the embodiment.

Next, the OFDM signal for detecting carriers will be described. FIG. 5 is a diagram illustrating an example of the frame configuration of a communication signal handled by the communication apparatus according to this embodiment. A frame of the OFDM communication signal contains a preamble 511, a synchronous symbol 512, a header 513, a payload 514, and a postamble 515.

The preamble 511 is a known signal added to a header of the frame. When determination is executed by receiving a part of the preamble 511, it can be known that the signal is the header of the frame. The preamble 511 is used for a carrier detecting process, a synchronizing process, an equalizing process, etc. The synchronous symbol 512 is a known signal used to establish synchronization. The header 513 contains various additional information of a frame packet such as a data source and a data destination. The payload 514 is a part of transmitted data body. The postamble 515 is a known signal added to the rear of the frame. When the determination is executed by receiving a part of the postamble 515, it can be known that the signal is the final section of the frame.

When a second communication apparatus also exists and carries out communication simultaneously in addition to a first communication apparatus for transmitting the communication signal of the frame, a coexistence signal 516 is transmitted from the second communication apparatus for a period of the preamble 511. The coexistence signal 516 is a known signal which is predetermined determined between communication systems for coexisting the plurality of communication systems such as the communication systems using different communication methods to each other. In accordance with whether the coexistence signal 516 exists, use allocation of transmission lines of the communication systems is determined.

Figure 6:
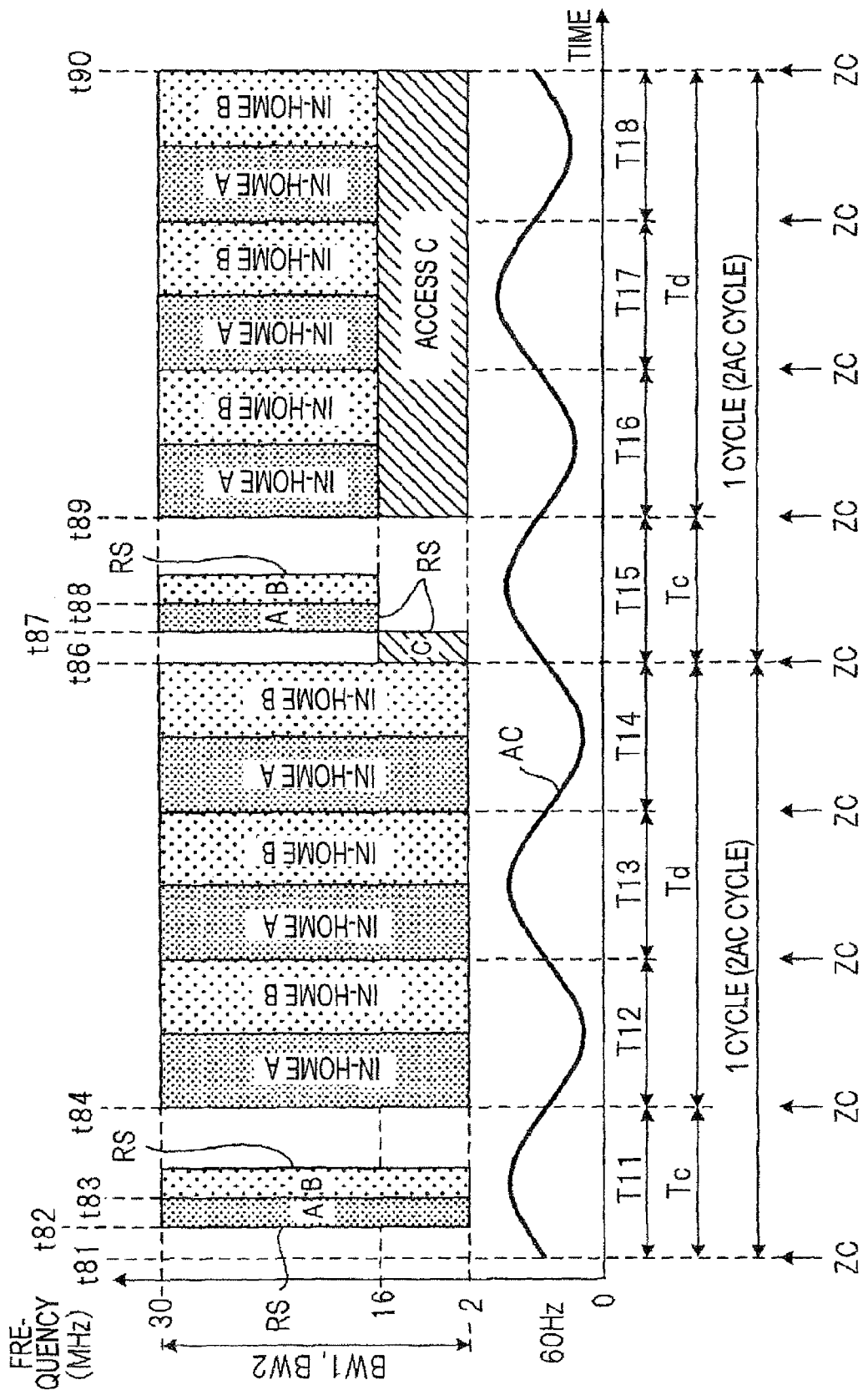
FIG. 6 is a time chart illustrating an example of an operation executed when a communication signal containing a coexistence signal is received.

Here, the coexistence signal will be described. FIG. 6 is a time chart illustrating an example of an operation executed when a communication signal containing the coexistence signal is received. When the communication apparatus outputs a request signal RS used as the coexistence signal, a zero cross circuit (not shown) detects a zero cross ZC of commercial alternating voltage AC. FIG. 6 shows an example where there are three communication methods, that is, a communication method "A" of a communication system (in-home system) for in-home communication where communication is carried out within houses or buildings, a communication method "B" of an in-home system, and a communication method "C" of a communication system (access system) for access communication where communication is carried out with the outside using an external transmission line.

The communication apparatus synchronizes with the zero cross ZC to determine whether an empty space is present in a channel to be used. "The channel" is at least one of time and a frequency range. Here, the channel is the frequency range. In this case, the communication apparatus searches the request signal RS for a control period Tc. For example, when the zero cross ZC is detected at time t81, a controller in the PLC PHY block 213 of the communication apparatus determines whether the request signal RS is output from time t81 to t82 by the carrier detection.

In the example of FIG. 6, it is assumed that time slots of the control period Tc are allocated in order of communication methods "C", "A", "B", . . . . When data communication is carried out by the communication methods "A", "B", . . . , a data period Td is time-divided into the communication methods "A", "B", . . . . In addition, when data communication is carried out by a communication method "C" in addition to the communication methods "A" and "B", a range of 16 to 30 MHz is allocated to the communication methods "A" and "B" and a range of 2 to 16 MHz is allocated to the communication method "C". In addition, a use frequency range is frequency-divided. It is assumed that the memory 240 of each communication apparatus stores information representing to use which multi access scheme when the time slots are allocated and a certain request signal RS is output.

For example, when the request signal RS is not output for a period from time t81 to t82 in a case where a communication apparatus a1 using the communication method "A" wants to use a frequency range of 2 to 30 MHz, a controller of the communication apparatus a1 determines that an empty space exists in the channel to be used. That is because the data communication is not carried out in the communication method "C" for a subsequent data period Td (time t84 to time t86). Therefore, at time t84, the communication apparatus a1 carries out the data communication using the frequency range of 2 to 30 MHz without executing a process of changing a phase vector. At this time, the communication apparatus a1 outputs the request signal RS at time t82. In addition, at time t83, a communication apparatus b1 which uses the communication method "B" outputs the request signal RS. When the communication apparatus b1 detects the request signal RS, the communication apparatus a1 determines that the data communication is carried out in the communication methods "A and "B" in a time division manner for the data period Td. Therefore, the communication apparatuses a1 and b1 carry out an alternate data communication for the data period Td.

In this embodiment, the carrier detector 455 of the receiving communication apparatus executes the carrier detecting process on at least one of the preamble, the postamble, and the coexistence signal of the above-described communication signal. By executing the carrier detecting process on the preamble in this embodiment, it is possible to detect the header of a packet with high accuracy. Therefore, it is possible to reduce packet reception errors and improve a reception performance of the communication apparatus. Moreover, by executing the carrier detecting process on the postamble 515 in this embodiment, it is possible to detect the end portion of the packet with high accuracy. Therefore, even when a noise overlaps in the packet, it is possible to switch from the data reception to a subsequent standby state and improve the reception performance of the communication apparatus. Furthermore, by executing the carrier detecting process on the coexistence signal in this embodiment, it is possible to receive the coexistence signal of another communication apparatus with high accuracy. Therefore, it is possible to prevent the interference in transmitting data to another device.

Figure 7:
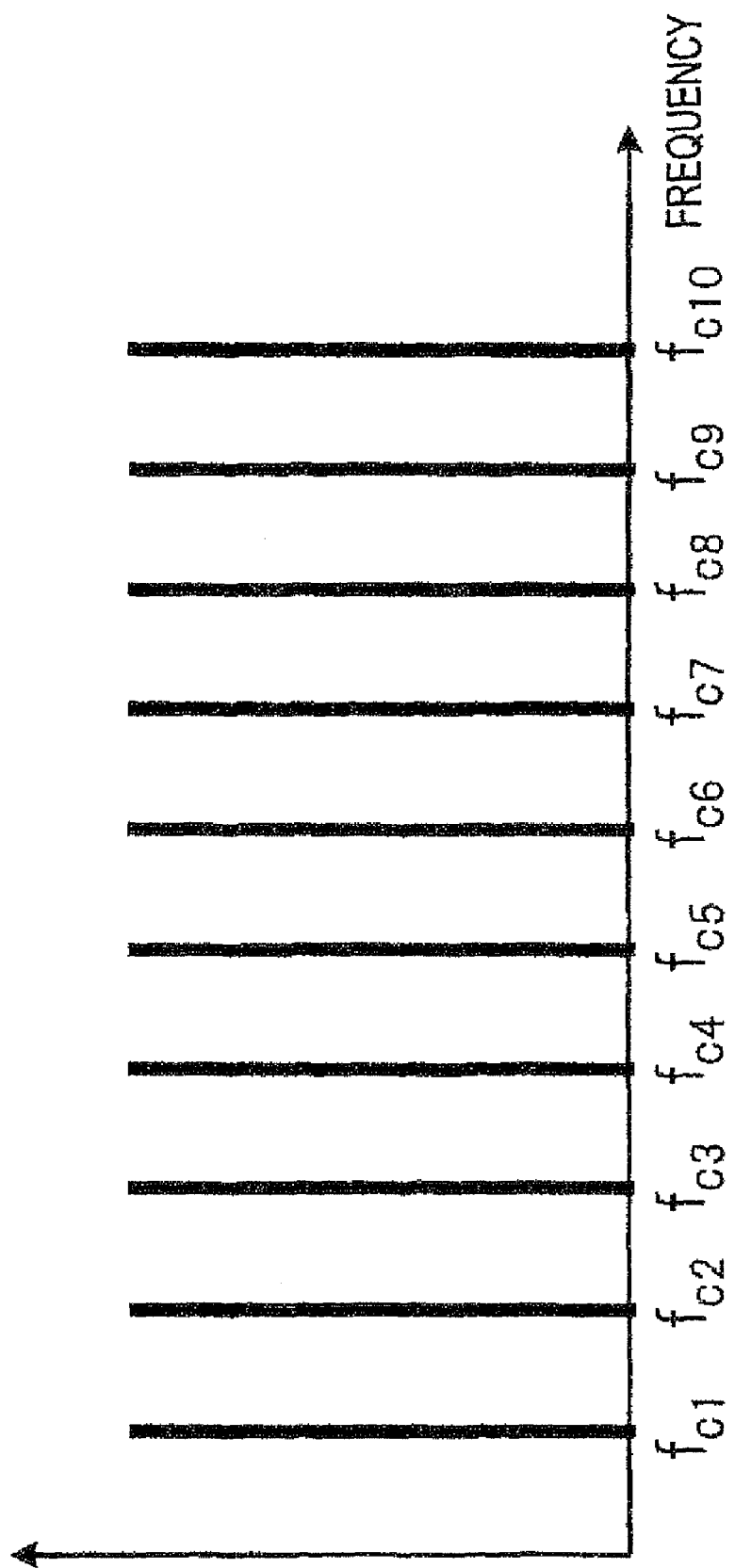
FIG. 7 is a diagram illustrating an arrangement example of sub-carriers of an OFDM signal.

Next, a frequency and a phase of each sub-carrier of the OFDM signal will be described. FIG. 7 is a diagram illustrating an arrangement example of sub-carriers of the OFDM signal. In the OFDM signal, the sub-carriers are arranged at the same interval in on the linear line of a frequency domain. FIG. 7 shows an example of OFDM signals $f_{c1}$ to $f_{c10}$ using a basic wave, a double wave, a triple wave, . . . as the sub-carriers. In this case, a transmitted signal s(t) output from the transmitting communication apparatus is expressed by Expression 1.

[Expression 1]

$$s(t) = \sum_{n=1}^{N} \left[ \begin{array}{l} a_n \cos\{2\pi(f_c + nf_0)t + \theta n\} - \\ b_n \sin\{2\pi(f_c + nf_0)t + \theta n\} \end{array} \right] \quad (1)$$

Here, $f_c$ denotes a frequency of the basic carrier in a carrier-frequency band of the OFDM, $f_o$ denotes a frequency interval between the adjacent sub-carriers, and n denotes an order of the sub-carrier. θn denotes a predetermined phase angle given in each sub-carrier. In the receiving communication apparatus, the phase angle θn is first inversely rotated and cancelled, when the carrier detecting process is executed.

Figure 8:
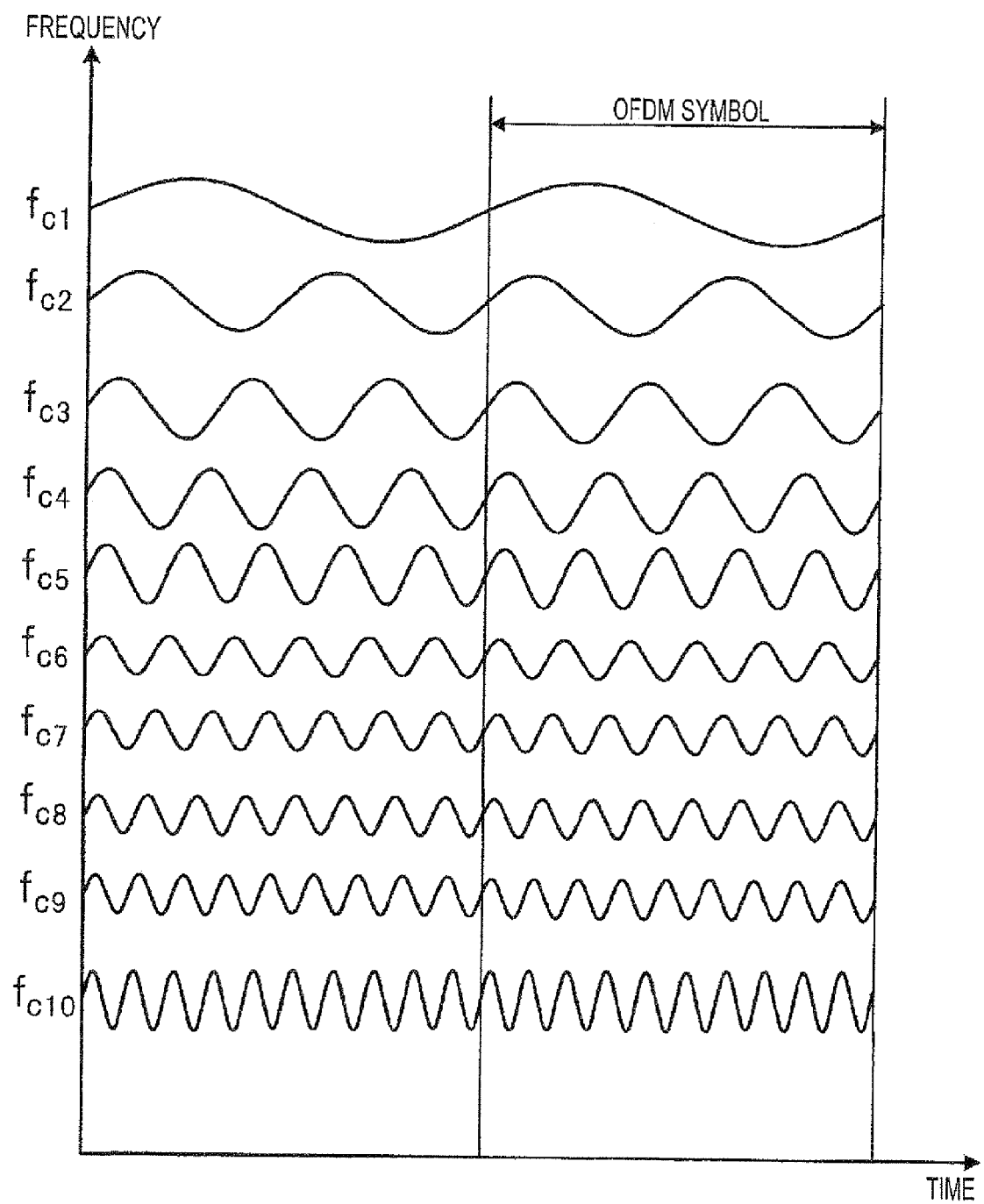
FIG. 8 is a diagram illustrating the waveforms of the sub-carriers of the OFDM signal shown in FIG. 7.

Subsequently, the features of a phase difference between symbols of the OFDM signal will be described. FIG. 8 is a diagram illustrating the waveforms of the sub-carriers of the OFDM signal shown in FIG. 7. In the example of FIG. 8, two OFDM symbols of the sub-carriers of the OFDM signal are shown. In a case of focusing the phase between symbols, the OFDM signal to be transmitted from the transmitting communication apparatus is transmitted so that the phases of the sub-carriers of the OFDM symbols continuous on the time domain are the same. In this case, in the received signal received by the receiving communication apparatus, the phases of the plurality of OFDM symbols continuous on the time domain are the same in all the sub-carriers. That is, when the OFDM symbols continuous on the time domain are partitioned by the use of a symbol length (one symbol section) in the sub-carriers of the received OFDM signal, the phase difference between the adjacent symbols becomes zero.

By evaluating the inter-symbol correlation by the use of the property of the OFDM signal, it is possible to determine whether the carriers for carrying the desired signal exist. A distribution degree of phase differences φs in the OFDM symbols continuous on the time domain is determined to evaluate the inter-symbol correlation. When the phase differences φs are mainly distributed near 0, it is determined that the carriers exist. Otherwise, it is determined that no carrier exists. For example, it is determined whether the absolute value of the phase difference s is equal to or smaller than π/4.

Alternatively, products of complex conjugates of constellation points of the adjacent symbols and the constellation points of target symbols may be calculated to determine the distribution, instead of evaluating the phase differences φs.

Figure 9:
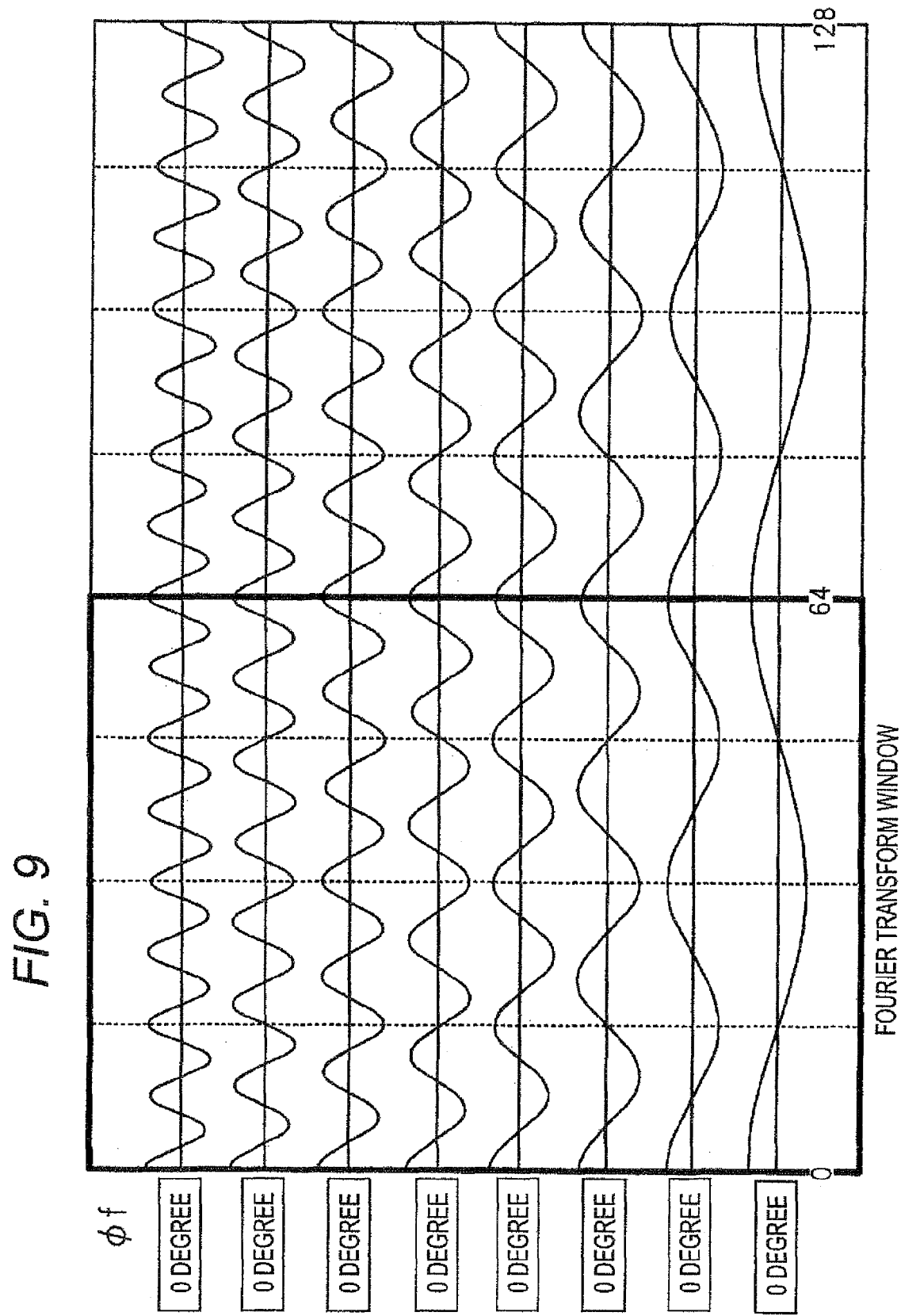
FIG. 9 is a diagram illustrating phase differences between the sub-carriers of the OFDM signal.
Figure 10:
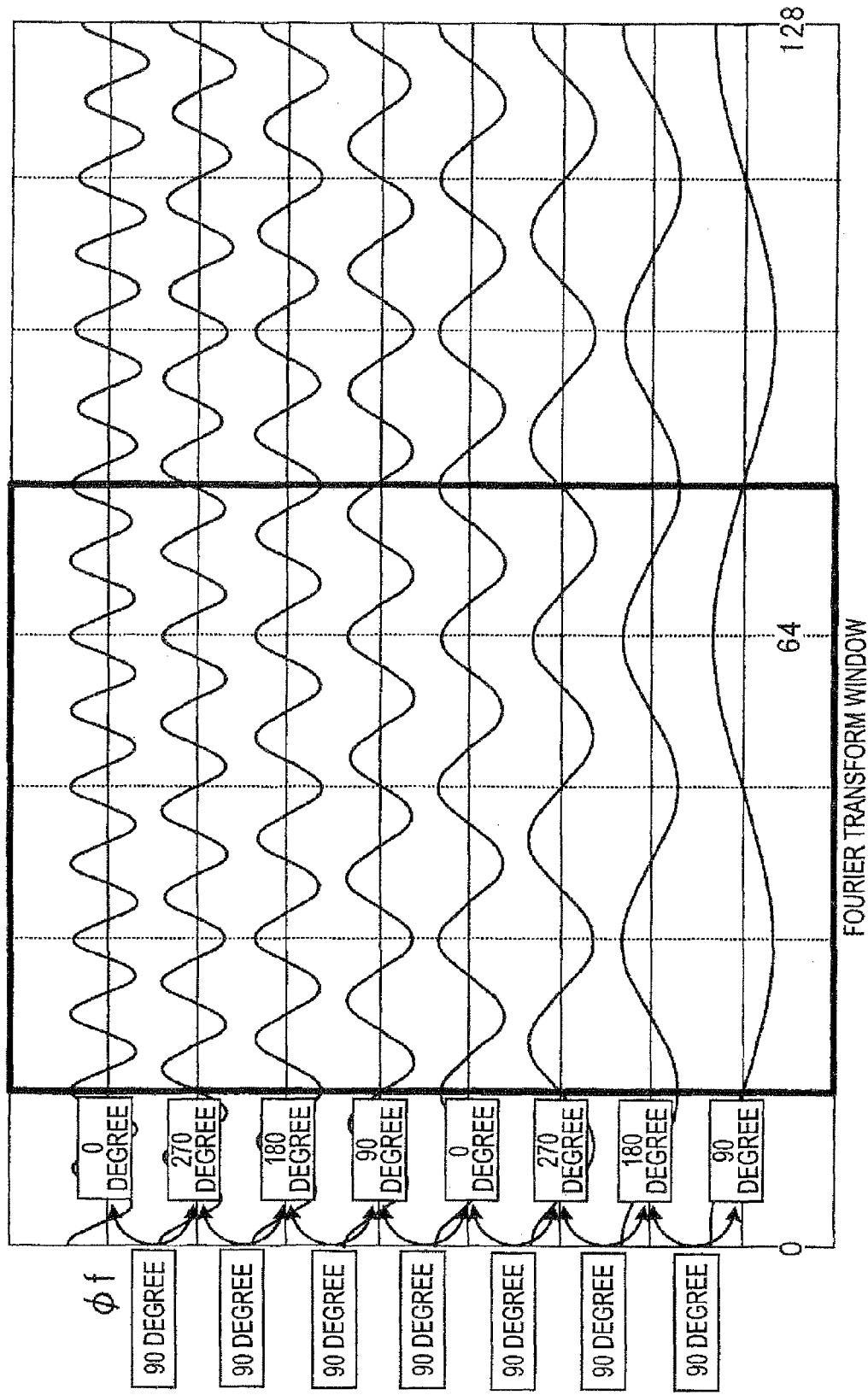
FIG. 10 is a diagram illustrating the phase differences between the sub-carriers of the OFDM signal.
Figure 11:
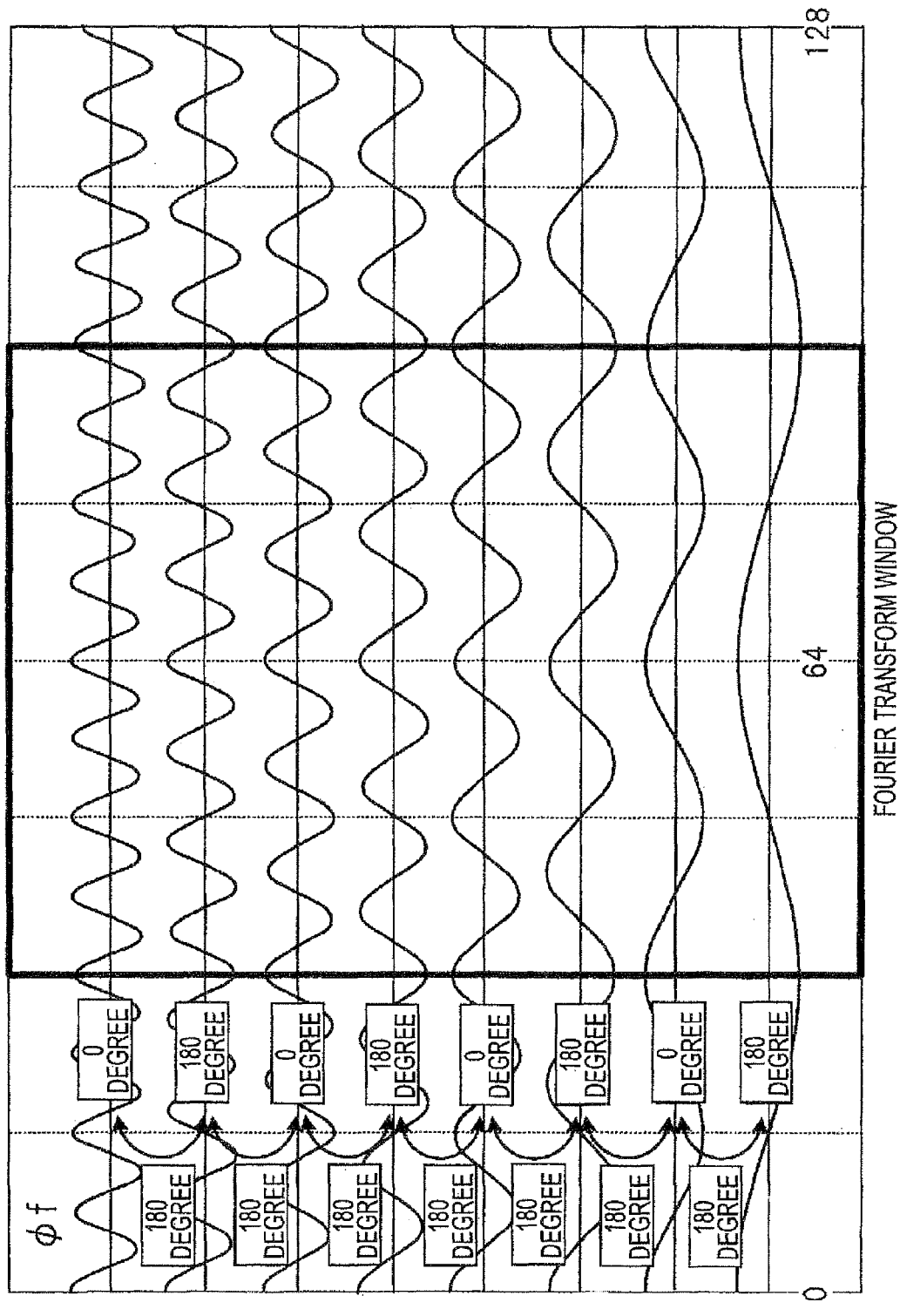
FIG. 11 is a diagram illustrating the phase differences between the sub-carriers of the OFDM signal.

Next, the feature of the phase differences between the carriers of the OFDM signal will be described. FIGS. 9 to 11 are diagrams illustrating the phase differences between the sub-carriers of the OFDM signal. In examples of FIGS. 9 to 11, two OFDM symbols for eight sub-carriers of the OFDM signal are shown. In the case of focusing on the phase between the carriers, the OFDM signal to be transmitted from the transmitting communication apparatus is transmitted so that the phases of all the sub-carriers are the same at synchronization timing of the symbols. In this case, in the received signal received by the receiving communication apparatus, the phase differences between the adjacent sub-carriers become equal. That is, a uniform phase difference φf between the adjacent sub-carriers is formed.

When reception timing of the received signal is matched with the synchronization timing of the symbol section, as in FIG. 9, the inter-carrier phase differences between the adjacent sub-carriers becomes zero, that is, the phases of all the sub-carriers are the same. When the reception timing of the received signal deviates from the synchronization timing of the symbol section by ¼ symbol, as in FIG. 10, the inter-carrier phase differences between the adjacent sub-carriers is π/4 (90 degrees). When the reception timing of the received signal deviates from the synchronization timing of the symbol section by ½ symbol, as in FIG. 11, the inter-carrier phase differences between the adjacent sub-carriers id π/2 (180 degrees). Likewise, even in other timing, the inter-carrier phase differences between all the adjacent sub-carriers is uniform.

Figure 12:
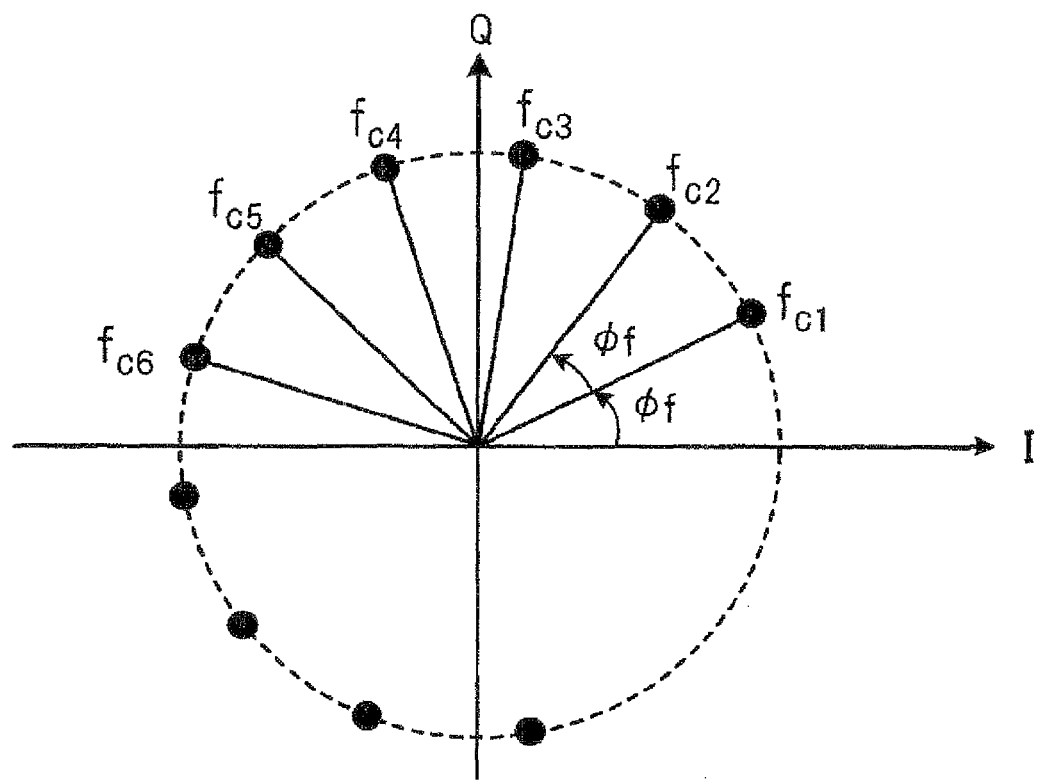
FIG. 12 is a diagram illustrating complex representation of the sub-carriers of the OFDM signal on the polar coordinates.

FIG. 12 is a diagram illustrating complex representation of the sub-carriers of the OFDM signal on the polar coordinates. In this way, when the complex representation of each sub-carrier is mapped on the polar coordinates, the sub-carriers are arranged with the uniform phase difference φf with respect to the adjacent sub-carrier. That is, the phase differences φf between the adjacent sub-carriers are the same in all the sub-carriers.

By evaluating the inter-carrier correlation by the use of the property of the OFDM signal, it is possible to determine whether the carriers carrying the desired signal exist. As for the inter-carrier correlation, whether a certain carrier has a phase of a predetermined relation of the desired OFDM signal with respect to another carrier can determine whether the carriers exist. In this case, when the carrier has the phase of "a phase of a basic carrier×N", where an order of the carrier is N, it can be determined that a carrier is the carrier having the symbols of the desired OFDM signal on the basis of the phase of the basic carrier and the order of the carrier. Alternatively, when the phase difference between the adjacent carriers is a phase which is based on the phase of the basic carrier, it can be determined that a carrier is the carrier having the symbols of the desired OFDM signal. When the phase difference between the carriers is determined, whether the complex coordinates representing the phase difference between the adjacent carriers are on the same quadrant (within a range of π/2) can determine whether the carriers exist.

When the complex coordinates are determined, a distribution degree of phase differences φf between the adjacent sub-carriers can be determined. When the phase differences φf are mainly distributed on the quadrants of the complex plane, it is determined that the carriers exist. Otherwise, it is determined that no carrier exists. For example, it is determined whether 75% or more (seven or more pairs of adjacent sub-carriers out of nine pairs of adjacent sub-carriers in the example of FIG. 12) of pairs of adjacent sub-carriers exist on the same quadrant. Alternatively, products of complex conjugates of constellation points of the adjacent carriers and the constellation points of target symbols may be calculated to determine the distribution, instead of evaluating the phase differences φf.

Figure 13:
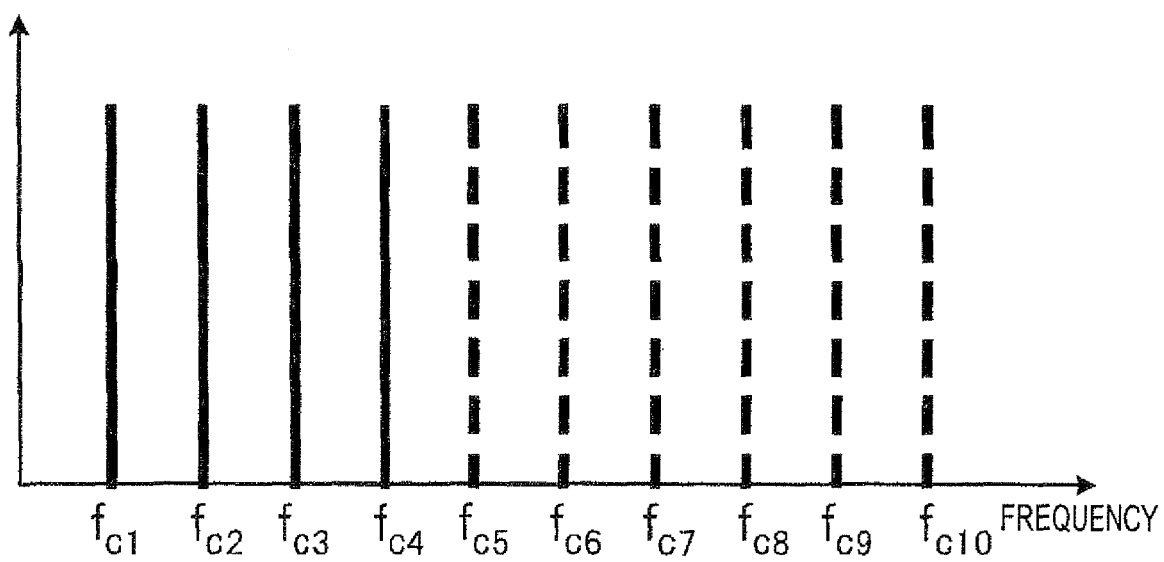
FIG. 13 is a diagram illustrating a state where the half or more of the sub-carriers of the OFDM signal shown in FIG. 7 cannot be normally received due to a noise.

FIG. 13 is a diagram illustrating a state where the half or more of the sub-carriers of the OFDM signal shown in FIG. 7 cannot be normally received due to a noise. When 60% of the sub-carriers are submerged in the noise or cannot be normally received and just 40% of the sub-carriers exist, as in an example of FIG. 13, there is a high probability that it cannot be normally determined whether the carriers of the desired signal exist. With the 40% of the sub-carriers which can be received, there is a low probability that the phase differences φf between the adjacent sub-carriers exist on the same quadrant, when the carrier detecting process is executed by the inter-carrier correlation. Therefore, in many cases, the distribution determination of the phase differences φf cannot be normally executed. Likewise, in the case of using the inter-symbol correlation, there is a low probability that the phase differences φs between the continuous symbols are not uniform and thus exist near 0 for the sub-carriers which cannot be normally received. Therefore, in many cases, it cannot be determined whether the carriers exist.

Therefore, in this embodiment, by combining the determination process executed by the use of the inter-symbol correlation and the determination process executed by the use of the inter-carrier correlation, the carrier detecting accuracy is improved. First, in a first step (first selection step), the sub-carriers where the phase difference φs is near 0 are selected from the sub-carriers by evaluating the inter-symbol correlation. Subsequently, in a second step (second selection step), the pairs of sub-carriers where the phase differences φf exist on the same quadrant of the complex plane are selected from the sub-carriers selected in the first step by evaluating the inter-carrier correlation between the adjacent sub-carriers. Subsequently, when a ratio of the number of pairs of the sub-carriers selected in the second step to the number of sub-carriers selected in the first step exceeds a predetermined ratio, it is determined that the carriers having the symbols of the desired OFDM signal exist. In addition, when the inter-carrier correlation is evaluated in the second step, the sub-carriers are not limited to the adjacent sub-carriers. Instead, by calculating the phase difference between sub-carriers having a predetermined frequency difference where the theoretical phase differences are the same, it may be determined whether the correlation exists.

Figure 14:
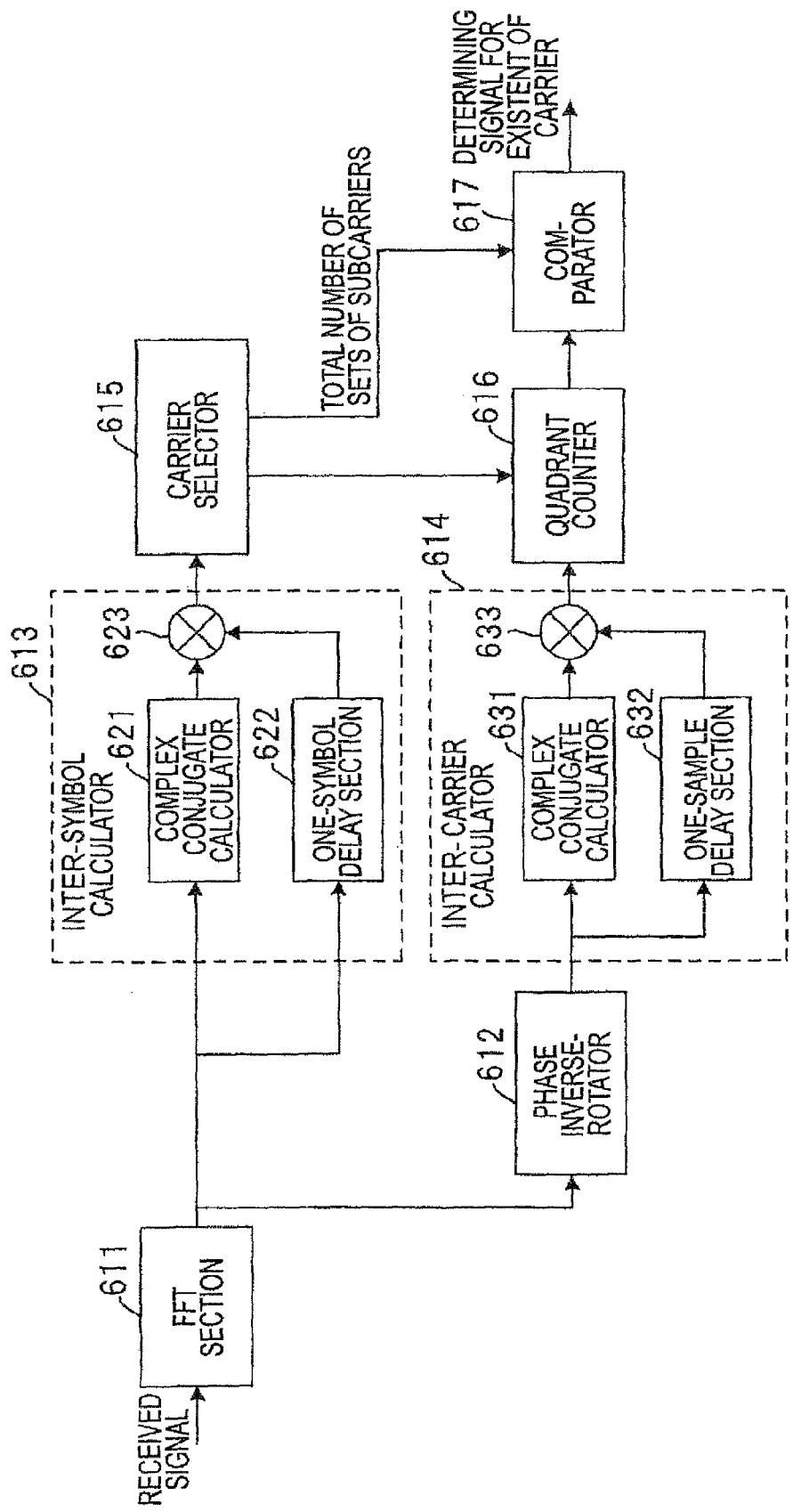
FIG. 14 is a block diagram illustrating the configuration of a carrier detector of the communication apparatus according to the embodiment.

Next, a carrier detecting method and a communication apparatus according to this embodiment will be described in detail. FIG. 14 is a block diagram illustrating the configuration of a carrier detector of the communication apparatus according to this embodiment. The carrier detector according to this embodiment includes an FFT section 611, a phase inverse rotator 612, an inter-symbol calculator 613, an inter-carrier calculator 614, a carrier selector 615, a quadrant counter 616, and a comparator 617. The FFT section 611 converts the received signal from a time domain to a frequency domain by the use of the fast Fourier transform and extracts the received data of the sub-carriers of the OFDM signal. The phase inverse rotator 612 inversely rotates the phase of the received data of the sub-carriers by a predetermined angle and returns the phase angle θn given to each sub-carrier in a transmission device to an original angle.

The inter-symbol calculator 613 includes a complex conjugate calculator 621, a one-symbol delay section 622, and a multiplier 623 and calculates a phase difference between the symbols continuous in each sub-carrier. That is, in the inter-symbol calculator 613, the complex conjugate calculator 621 calculates a complex conjugate of the symbols of a signal of a certain sub-carrier at the present time, the one-symbol delay section 622 delays one symbol period, and the multiplier 623 multiplies the conjugate complex representation of the present symbol and the complex representation prior to one symbol to obtain the product thereof. The calculation result is a value corresponding to the phase difference φs between the symbols continuous on the time domain and the value is output from the inter-symbol calculator 613.

Here, inter-symbol calculation will be described in detail. In the same sub-carriers, it is assumed that the complex vector of a certain symbol (first symbol) S1 is $C_{S1}$, the complex coordinates of the complex vector are $(I_{S1}, Q_{S1})$, a complex vector of a symbol (second symbol) S2 adjacent to the complex vector on the time domain is $C_{S2}$, and complex coordinates of the complex vector are $(I_{S2}, Q_{S2})$. In order to calculate the phase difference between the symbols S1 and S2 adjacent to each other, the complex numbers is divided to calculate a quotient of the symbols on the complex coordinates by Expression (2).

[Expression 2]

$$\frac{C_{S2}}{C_{S1}} = \frac{(I_{S1}I_{S2} + Q_{S1}Q_{S2}) + j(I_{S1}Q_{S2} - I_{S2}Q_{S1})}{I_{S1}^2 + Q_{S1}^2} \quad (2)$$

In order to determine whether the inter-symbol correlation exists, it is determined whether the value of Expression (2) falls within a predetermined range.

Alternatively, by using the product of the complex representation of the first symbol S1 and the quadrant complex representation of the second symbol S2 by Expression (3), it is determined whether a value of Expression (3) falls within a predetermined range.

[Expression 3]

$$C_{S1}C^*_{S2} = (I_{S1}+jQ_{S1})(I_{S2}-jQ_{S2}) = (I_{S1}I_{S2}+Q_{S1}Q_{S2}) + j(Q_{S1}I_{S2}-I_{S1}Q_{S2}) \quad (3)$$

When Expression (3) is used, the determination of the phase difference $|\phi s| \leq \pi/4$ between the symbols is executed under a condition that a real part is larger than zero and the real part is larger than the absolute value of an imaginary part in Expression (4).

[Expression 4]

$$(I_{S1}I_{S2}+Q_{S1}Q_{S2}) > 0$$

$$(I_{S1}I_{S2}+Q_{S1}Q_{S2}) > |(Q_{S1}I_{S2}-I_{S1}Q_{S2})| \quad (4)$$

In this way, whether the phases of the symbols adjacent to each other in the same sub-carrier are in a continuous state is determined by the calculation in each sub-carrier.

A phase difference $\phi_{S1S2}$ between the symbols S1 and S2 adjacent to each other is calculated sequentially by Expression (5) using the real part and the imaginary part of Expression (3).

[Expression 5]

$$\phi_{S1S2} = \arctan\left(\frac{|(Q_{S1}I_{S2} - I_{S1}Q_{S2})|}{(I_{S1}I_{S2} + Q_{S1}Q_{S2})}\right) \quad (5)$$

Subsequently, whether the difference $\phi_{S1S2}$ calculated by Expression (5) is smaller than a predetermined threshold value is determined under a condition of Expression (6). In addition, a table of $(I_{S1}I_{S2}+Q_{S1}Q_{S2})$ and $(Q_{S1}I_{S2}-I_{S1}Q_{S2})$ may be prepared in advance.

[Expression 6]

$$\phi_{S1S2} < \phi_1 \quad (6)$$

The carrier selector 615 selects the sub-carriers where the phase difference between the continuous symbols is zero or is close to the zero, by using the calculation result of the inter-symbol calculator 613. Here, the carrier selector selects the sub-carriers where the phase difference between the symbols is equal to or smaller than π/4. In addition, the selection result of the sub-carriers is output to the counter 616 in every quadrant and the number of sub-carriers where all the phase differences between the selected sub-carrier and the sub-carrier adjacent to the selected sub-carrier are equal to or smaller than π/4 is output as a total number to the comparator 617. Here, the inter-symbol calculator 613 and the carrier selector 615 have the function of the first selecting unit.

The inter-carrier calculator 614 includes a complex conjugate calculator 631, a one-sample delay section 632, and a multiplier 633 and calculates the phase difference between the adjacent sub-carriers. That is, in the inter-carrier calculator 614, the complex conjugate calculator 631 calculates a complex conjugate of a certain sub-carrier, the one-sample delay section 632 delays one sample period, and the multiplier 633 multiplies the conjugate complex representation and the complex representation of the adjacent sub-carrier to obtain the product thereof. The calculation result is a value corresponding to the phase difference φf between the sub-carriers adjacent on the frequency domain and the value is output from the inter-carrier calculator 614.

Here, inter-carrier calculation will be described in detail. It is assumed that a complex vector of a certain symbol (first carrier) f1 is $C_{f1}$, the complex coordinates of the complex vector are $(I_{f1}, Q_{f1})$, a complex vector of the same symbol of a sub-carrier (second carrier) f2 adjacent to the complex vector on the frequency domain is $C_{f2}$, and complex coordinates of the complex vector is $(I_{f2}, Q_{f2})$. In order to calculate the phase difference between the carriers f1 and f2 adjacent to each other, the complex numbers is divided to calculate a quotient of the carriers on the complex coordinates by Expression (7).

[Expression 7]

$$\frac{C_{f2}}{C_{f1}} = \frac{(I_{f1}I_{f2} + Q_{f1}Q_{f2}) + j(I_{f1}Q_{f2} - I_{f2}Q_{f1})}{I_{f1}^2 + Q_{f1}^2} \quad (7)$$

In order to determine whether the inter-carrier correlation exists, it is determined whether the value of Expression (7) falls within a predetermined range.

Alternatively, by using the product of the complex representation of the first carrier f1 and the quadrant complex representation of the second carrier f2 by Expression (8), it is determined whether a value of Expression (8) falls within a predetermined range.

[Expression 8]

$$C_{f1}C^*_{f2}=(I_{f1}+jQ_{f1})(I_{f2}-jQ_{f2})=(I_{f1}I_{f2}+Q_{f1}Q_{f2})+j(Q_{f1}I_{f2}-I_{f1}Q_{f2}) \quad (8)$$

A phase difference $\phi_{f1f2}$ between the carriers f1 and f2 adjacent to each other is calculated in order by Expression (9) using the real part and the imaginary part of Expression (8).

[Expression 9]

$$\phi_{f1f2} = \arctan\left(\frac{(Q_{f1}I_{f2} - I_{f1}Q_{f2})}{(I_{f1}I_{f2} + Q_{f1}Q_{f2})}\right) \quad (9)$$

As a method of simply calculating the inter-carrier correlation, it is determined whether the distribution of the constellation points where values of Expression (8) are depicted on the complex plane exists on the same quadrant among a I quadrant, a II quadrant, a III quadrant, and a IV quadrant. When the phase difference between the adjacent sub-carriers is the same, the phase angle representing the phase difference is the same in all the sub-carriers. Therefore, for all the sub-carriers, the constellation points depicted on the complex plane by the real part and the imaginary part of Expression (8) exist on the same quadrant. By using this property, for the pairs of plural adjacent sub-carriers, it is determined whether the phase angles representing the phase difference between the sub-carriers exist on the same quadrant. When it is determined whether the phase angles exist on the same quadrant, a case where the phase angles are distributed mainly in 0, $\pi/2$, $\pi$, and $3\pi/2$ is taken into consideration and it is determined whether the phase angles exist on the two adjacent quadrants such as the I quadrant and the II quadrant, the II quadrant and the III quadrant, the III quadrant and the IV quadrant, and the IV quadrant and the I quadrant.

The quadrant counter 616 executes counting in accordance with each quadrant to determine on which quadrant the constellation points representing the phase difference between the adjacent sub-carriers exist on the complex plane for the sub-carriers selected in the carrier selector 615, by using the calculation result of the inter-carrier calculator 614. Here, the inter-carrier calculator 614 and the quadrant counter 616 have the function of the second selecting unit.

The comparator 617 which has the function of a carrier determining unit compares the count value counted by the quadrant counter 616 in accordance with each quadrant to a total number of carriers output from the carrier selector 615 and determines whether a ratio of the count value of a specific quadrant to the total number of carriers is equal to or larger than a predetermined ratio. Here, when the ratio of the count value of a specific quadrant to the total number of carriers is equal to or larger than the predetermined ratio, the comparator 617 outputs a signal of "carrier existence" (for example, a high level) as a signal for determining whether the carriers exist. Alternatively, when the ratio of the count value of a specific quadrant to the total number of carriers is smaller than the predetermined ratio, the comparator 617 outputs a signal of "carrier non-existence" (for example, a low level) as the signal for determining whether the carriers exist.

For example, in the example of the OFDM signals $f_{c1}$ to $f_{c10}$) shown in FIG. 7, when it is assumed that the sub-carriers $f_{c1}$, $f_{c2}$, $f_{c3}$, $f_{c4}$, and $f_{c10}$ are selected from the inter-symbol calculation, three pairs of $f_{c1}$-$f_{c2}$, $f_{c2}$-$f_{c3}$, and $f_{c3}$-$f_{c4}$, which are the pairs of adjacent sub-carriers, are selected and the inter-carrier calculation is executed on three pairs of sub-carriers. Subsequently, by determining whether the phase differences between the sub-carriers exist on the same quadrant, it is determined whether the carriers carrying the desired signal exist. By executing this process, it is possible to improve accuracy of the carrier detection.

Figure 15:
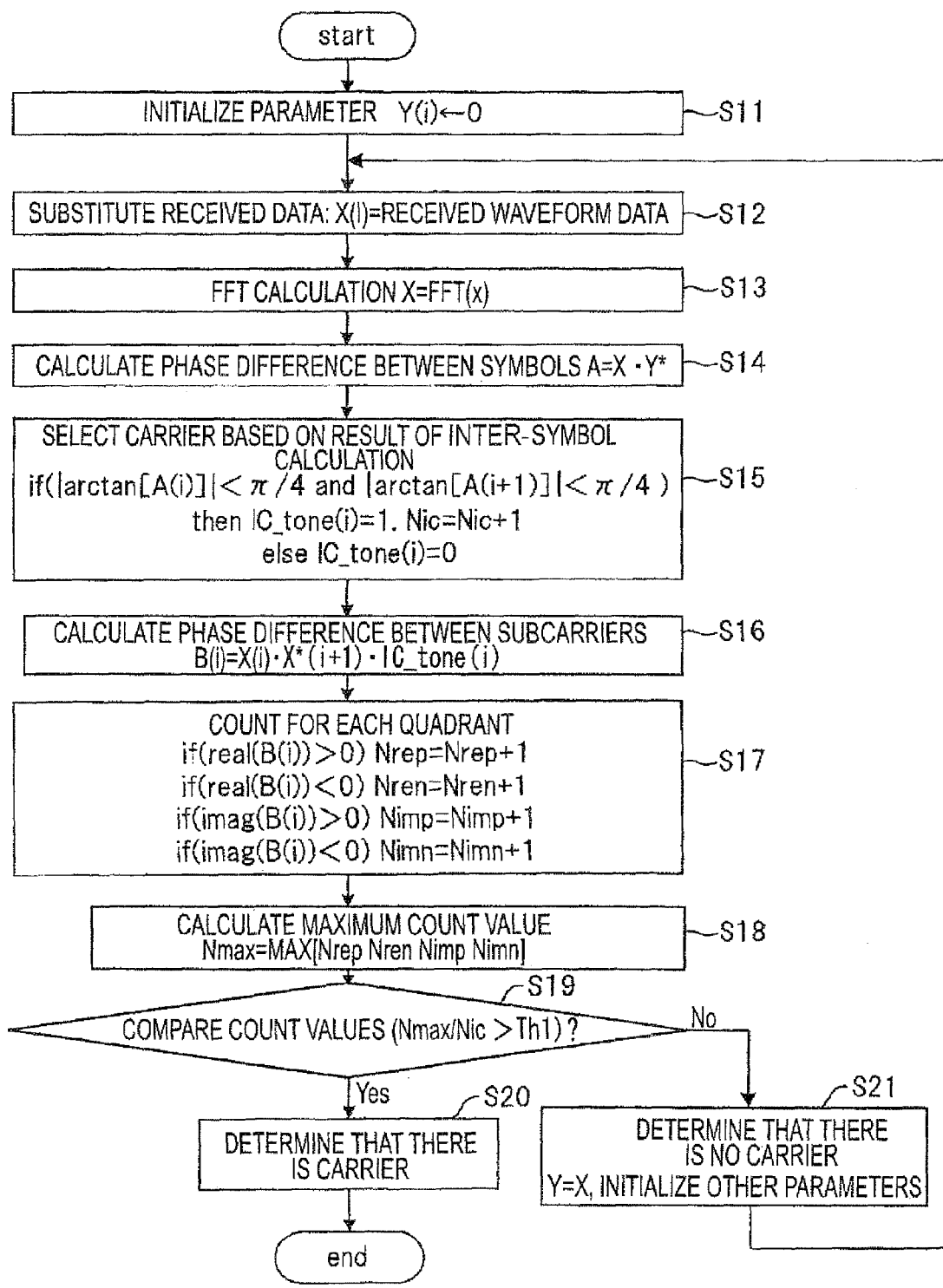
FIG. 15 is a flowchart illustrating a first processing order of the operation of the carrier detector according to the embodiment.

Next, an operation example of the carrier detector having the above-described configuration according to this embodiment will be described. FIG. 15 is a flowchart illustrating a first processing order of the operation of the carrier detector according to this embodiment. In the carrier detector shown in FIG. 14 according to this embodiment, a software program including the order of the flowchart shown in FIG. 15 is executed on the PLC PHY block 213 and the CPU 211 in FIG. 3 to realize the function of the units. In this case, data on received signals or arithmetic processes are stored on the memory 211. Of course, the carrier detector according to this embodiment may be realized by hardware.

The carrier detector first initializes a variable Y representing an FFT result of a previous symbol in a variable initializing process by substituting $Y(i)\leftarrow 0$ (step S11). Here, "i" denotes a parameter corresponding to individual carrier. Subsequently, as a substitution process of reception data, $x(i)$=reception data is substituted to a variable x representing the reception data on the time domain (step S12). Subsequently, in an FFT calculating process, the FFT section 611 calculates X=FFT(x) for a variable X representing the reception data on the frequency domain (step S13).

Subsequently, in an inter-symbol phase difference calculating process, the inter-symbol calculator 613 calculates A=X·Y* for a variable A representing an inter-symbol phase difference and calculates the phase difference between the symbols (step S14). Here, "·" indicates multiplication and "*" indicates the complex conjugate. Subsequently, the carrier selector 615 executes carrier selection to select the sub-carriers having the high inter-symbol correlation on the basis of the calculation result of the inter-symbol calculator 613 (step S15). At this time, when $|\arctan[A(i)]|<\pi/4$ or $|\arctan[A(i+1)]|<\pi/4$, a relation of IC_tone(i)=1 and a relation of Nic=Nic+1 are established. That is, when the absolute value of an inter-symbol phase difference A(i) of a certain sub-carrier is smaller than $\pi/4$ and the absolute value of an inter-symbol phase difference A(i+1) of a sub-carrier adjacent to the certain sub-carrier is smaller than $\pi/4$, that is, when all the absolute values of the inter-symbol phase differences A of the adjacent carriers are smaller than $\pi/4$, the sub-carriers are selected as a target of the inter-carrier correlation and the value of a variable Nic increases by one. Here, IC_tone(i) is a coefficient representing whether the carriers are selected for each sub-carrier and Nic is a variable representing a total number of carriers as the number of pairs of selected adjacent sub-carriers. On the other hand, when the above conditions are not satisfied, that is, when the inter-symbol phase difference A is equal to or larger than $\pi/4$, a relation of IC_tone(i)=0 is established. This calculating process is executed for all the sub-carriers.

Subsequently, in a process of calculating the phase difference between the carriers, the inter-carrier calculator 614 calculates B(i)=X(i)·X*(i+1)·IC_tone(i) to obtain a variable B representing the phase difference between the carriers and calculates the phase difference between the sub-carriers (step S16). At this time, by multiplying IC_tone(i), the carrier selection result obtained in step S15 is reflected. In this way, the phase difference between the adjacent sub-carriers is calculated only for the sub-carrier selected on the basis of the inter-symbol calculation result. A relation of B(i)=0 is satisfied for the sub-carrier which is not selected in the case of IC_tone(i)=0.

Subsequently, in a quadrant count process, the quadrant counter 616 counts the number of B(i) representing the phase difference between the carriers calculated in step S16 in each quadrant of the complex plane (step S17). In this way, it is determined on which quadrant the constellation point representing the phase difference between the adjacent sub-carriers exists, and the number of the pairs of sub-carriers is counted in each corresponding quadrant. In this case, when real(B(i))>0, that is, when the real part of B(i) is positive and exists on the I quadrant or the II quadrant, a relation of Nrep=Nrep+1 is established. Alternatively, when real(B(i)) <0, that is, when the real part of B(i) is negative and exists on the III quadrant and the IV quadrant, a relation of Nren=Nren+1 is established. In addition, when imag(B(i))>0, that is, the imaginary part of B(i) is positive and exists on the I quadrant or the IV quadrant, a relation of Nimp=Nimp+1 is established. Alternatively, when imag(B(i))<0, that is, the imaginary part of B(i) is negative and exists on the II quadrant or the III quadrant, a relation of Nimn=Nimn+1 is established. Here, Nrep, Nren, Nimp, and Nimn are variables representing a count value of the number of pairs of the adjacent sub-carriers existing on the respective quadrants.

Subsequently, in a count maximum value calculating process, the quadrant counter 616 calculates the maximum value of quadrant count values Nrep, Nren, Nimp, and Nimn calculated in step S17 (step S18). At this time, the maximum value Nmax is calculated by the use of Nmax=MAX [Nrep Nren Nimp Nimn].

Subsequently, in a counter value comparing process, the comparator 617 determines whether the maximum value Nmax of the counter values calculated in step S18 is larger than a predetermined value (step S19). At this time, it is determined whether a relation of Nmax/Nic>Th1 is satisfied, that is, whether a value obtained by dividing the maximum value of the quadrant count values by the total number of carriers is larger than the threshold value Th1. In this way, it can be determined whether a ratio (Nmax/Nic) of the number (Nmax) of pairs of adjacent sub-carriers having the high inter-carrier correlation to the total number (Nic) of pairs of sub-carriers having the high inter-symbol correlation is equal to larger than the predetermined value (Th1). The threshold value Th1 is preferably about 0.75, for example.

In step S19, when a relation of Nmax/Nic>Th1 is satisfied, it is determined that the carrier exists (step S20), and then the process ends. Alternatively, when a relation of Nmax/Nic≦Th1 is satisfied, it is determined that no carrier exists. The other variables are initialized in a state where Y=X (step S21). The process is returned to step S12 to repeat the same process on a subsequent symbol.

Even when only the half or less of the total number of sub-carriers cannot be normally received, for example by the above-described order, it is possible to execute the carrier detection with high accuracy by combining the inter-symbol correlation calculation and the inter-carrier correlation calculation.

Figure 16:
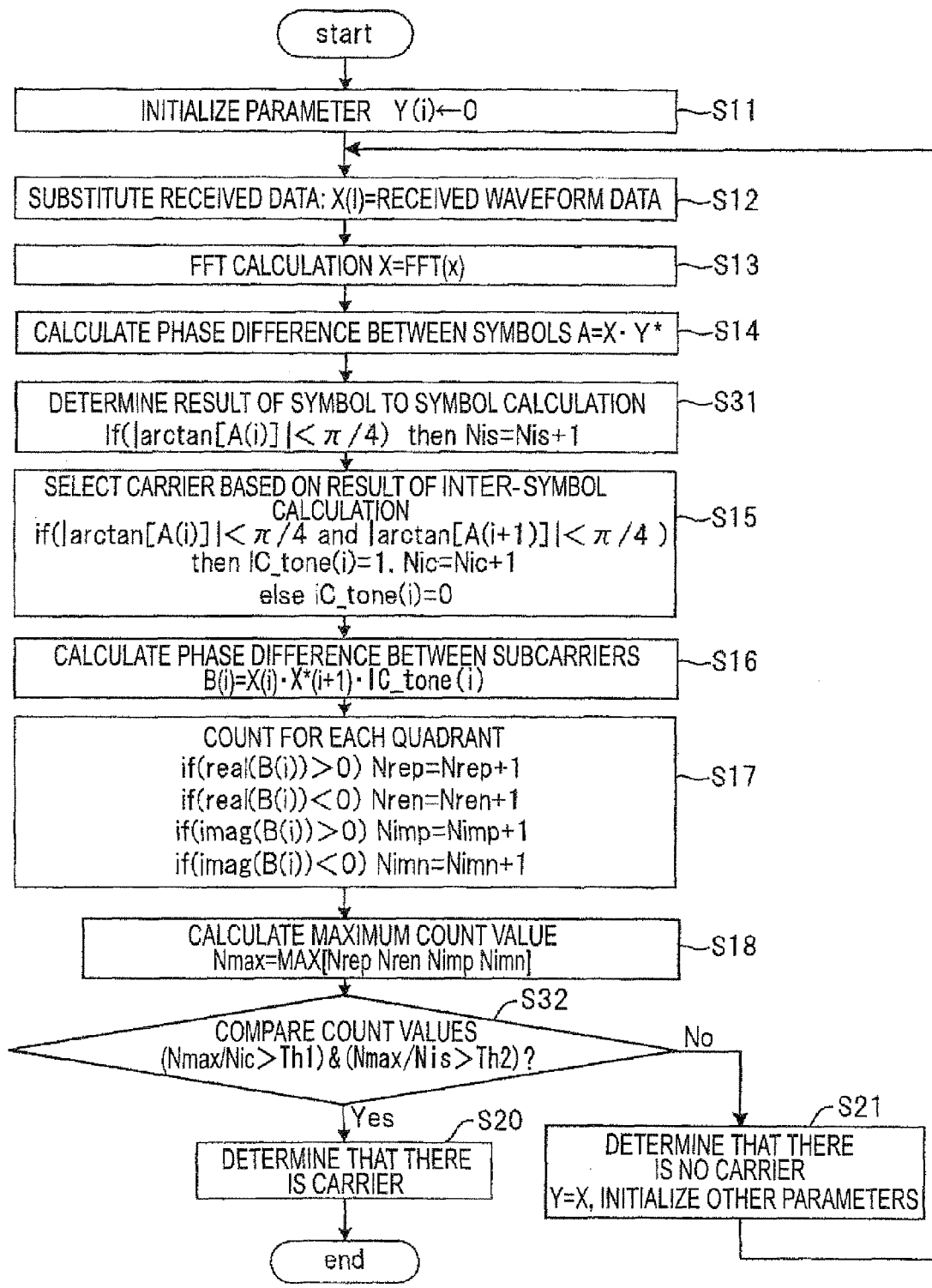
FIG. 16 is a flowchart illustrating a second processing order of the operation of the carrier detector according to the embodiment.

FIG. 16 is a flowchart illustrating a second processing order of the operation of the carrier detector according to this embodiment. A second example is a modified example of the first example shown in FIG. 15. An inter-symbol calculation result determining process of step S31 is added between steps S14 and S15 and the counter value comparing process of step S19 is changed into a counter value comparing process of step S32. Here, only different points from those of the first embodiment in FIG. 15 will be described.

After the inter-symbol calculator 613 calculates A=X·Y* in step S14, the carrier selector 615 determines the calculation result of the inter-symbol calculator 613 in each carrier (step S31). At this time, when |arctan [A(i)]|<π/4, a relation of Nis=Nis+1 is established. That is, the absolute value of the inter-symbol phase difference A(i) of a certain sub-carrier is smaller than π/4, the value of a variable Nis representing a total number of received carriers as the number of sub-carriers having the high inter-symbol correlation increases by one. Subsequently, the carrier selector 615 selects the carriers on the basis of the calculation result of the inter-symbol calculator 613 in step S15 and selects the pair of sub-carriers having the high inter-symbol correlation. In steps S16 to S18, the processes described in FIG. 15 according to the first embodiment are executed.

After the quadrant counter 616 calculates the maximum value of the quadrant count values Nrep, Nren, Nimp, and Nimn in step S18, the comparator 617 determines whether the maximum value Nmax of the count value calculated in step S18 is larger than a predetermined value in the count value comparing process (step S32). At this time, it is determined whether a relation of Nmax/Nic>Th1 and a relation of Nmax/Nis>Th2 are satisfied. That is, it is determined whether a value obtained by dividing the maximum value of the quadrant count values by the total number of carriers is larger than the first threshold value Th1 and a value obtained by dividing the maximum value of the quadrant count values by the total number of received carriers is larger than the second threshold value Th2. In this way, it can be determined whether a ratio (Nmax/Nic) of the number (Nmax) of pairs of adjacent sub-carriers having the high inter-carrier correlation to the total number (Nic) of pairs of sub-carriers having the high inter-symbol correlation is equal to larger than the predetermined value (Th1) and a ratio (Nmax/Nis) of the number (Nmax) of pairs of adjacent sub-carriers having the high inter-carrier correlation to the total number (Nis) of pairs of sub-carriers having the high inter-symbol correlation is equal to larger than the predetermined value (Th2). The first threshold value Th1 is preferably about 0.75, for example and the second threshold value Th2 is preferably about 0.5, for example.

When the ratio of the number of sub-carriers having the high inter-carrier correlation in the sub-carriers determined to have the high inter-symbol correlation is determined, the total number of pairs of sub-carriers having the high inter-symbol correlation in the adjacent sub-carriers and the total number of sub-carriers having the high inter-symbol correlation in unit of sub-carrier are used. Therefore, it is possible to distinguish a case where the sub-carriers having the high inter-symbol correlation are not continuous. When the sub-carriers determined to have the high inter-symbol correlation are not continuous, it can be considered that erroneous detection of the inter-symbol correlation may occur. For example, the sub-carrier cannot be normally received. Since this case can be excluded from the determination result, it is possible to reduce the erroneous detection of the carrier and further improve the accuracy of the carrier detection.

In this embodiment, as described above, by using the feature of the phase of the carrier of another frequency in the OFDM signal, the first carriers are selected on the basis of the inter-symbol correlation and the second carriers are selected on the basis of the inter-carrier correlation. In addition, from the result, it is determined whether the frequency corresponding to each carrier of the desired OFDM signal among the received signals has the symbols of the desired OFDM signal. Therefore, the carrier detection can be executed with high accuracy. In addition, when the inter-carrier correlation is evaluated, whether the carrier exists can be determined in a simple manner and with high accuracy by calculating the phase differences between the adjacent carriers and determining whether the phase differences exist on the same quadrant of the complex plane. Therefore, the process of determining the carriers can be executed at high speed. Accordingly, according to this embodiment, it is possible to determine whether the multi-carrier signal exists in a short period of time.

The invention is not limited to the above-described embodiment, but may be modified or applied by a person skilled in the art on the basis of the description of the specification and known techniques. Moreover, the modification and the application pertain to the scope of the protection of the invention.

According to the invention, it is possible to obtain an advantage of determining whether the multi-carrier signal exists with high accuracy and in a short period of time. For example, in the power line communication, the invention is applicable to an OFDM symbol detecting method of detecting the symbols of the OFDM signal transmitted from another communication apparatus and a communication apparatus including the OFDM symbol detector.

The present application is based on Japanese Patent Application No. 2008-198213 filed on Jul. 31, 2008, the contents of which are incorporated herein for reference.

What is claimed is:

1. A method of detecting symbols of an OFDM signal constituted by a plurality of carriers transmitted from another communication apparatus, comprising:
    selecting first carriers, where a phase difference between the symbols adjacent on a time domain is smaller than a predetermined value, from a plurality of carriers of a received signal;
    selecting second carriers, each of which has a phase of a predetermined relation of the OFDM signal with respect to another carrier, from the selected first carriers; and
    determining whether the received signal has the symbols of the OFDM signal transmitted from the another communication apparatus on the basis of the selection results of the first and second carriers, wherein:
    in the process of selecting second carriers, a carrier having a phase being "a phase of a basic carrier×N", where an order of the carrier is N, as the phase of the predetermined relation is selected as the second carrier on the basis of the phase of the basic carrier and the order of the carrier.

2. The method according to claim 1, wherein in the process of selecting second carriers, a carrier having a phase, where a phase difference between the adjacent carriers is constant, as the phase of the predetermined relation is selected as the second carrier.

3. The method according to claim 2, wherein in the process of selecting second carriers, carriers where complex coordinates representing the phase difference between the adjacent carriers exist on the same quadrant are selected as the second carrier.

4. A method of detecting symbols of an OFDM signal constituted by a plurality of carriers transmitted from another communication apparatus, comprising:
    selecting first carriers, where a phase difference between the symbols adjacent on a time domain is smaller than a predetermined value, from a plurality of carriers of a received signal;
    selecting second carriers, each of which has a phase of a predetermined relation of the OFDM signal with respect to another carrier, from the selected first carriers; and
    determining whether the received signal has the symbols of the OFDM signal transmitted from the another communication apparatus on the basis of the selection results of the first and second carriers, wherein:
    in the carrier determination process, it is determined that the received signal has the symbols of the OFDM signal, when a ratio of the number of second carriers to the number of first carriers is equal to or larger than a predetermined ratio.

5. The method according to claim 4, wherein in the process of selecting first carriers, the number of carriers where the phase differences between the symbols adjacent on the time domain in the carrier and a carrier adjacent to the carrier are smaller than a predetermined value is detected as a total number of carriers; and
    wherein in the carrier determination process, it is determined that the received signal has the symbol of the OFDM signal, when a ratio of the number of second carriers to the total number of carriers is equal to or larger than a predetermined threshold value.

6. The method according to claim 4, wherein in the process of selecting first carriers, the number of individual carriers where the phase difference between the symbols adjacent on the time domain is smaller than a predetermined value is detected as a total number of received carriers, and the number of carriers where the phase differences between the symbols adjacent on the time domain in the carrier and a carrier adjacent to the carrier are smaller than a predetermined value is detected as a total number of carriers; and
    wherein in the carrier determination process, it is determined that the received signal has the symbols of the OFDM signal, when a ratio of the number of second carriers to the total number of carriers is equal to or larger than a first threshold value, and a ratio of the number of second carriers to the total number of received carriers is equal to or larger than a second threshold value.

7. The method according to claim 1, wherein the received signal is a preamble of a packet.

8. The method according to claim 1, wherein the received signal is a postamble of a packet.

9. The method according to claim 1, wherein the received signal is a coexistence signal transmitted from another communication apparatus.

* * * * *